(12) United States Patent
Babaei et al.

(10) Patent No.: US 11,671,204 B2
(45) Date of Patent: *Jun. 6, 2023

(54) WIRELESS DEVICE CONTROL CHANNEL MONITORING

(71) Applicant: Beijing Xiaomi Mobile Software Co., Ltd., Beijing (CN)

(72) Inventors: Alireza Babaei, Fairfax, VA (US); Esmael Hejazi Dinan, McLean, VA (US); Hyoungsuk Jeon, Centreville, VA (US); Kyungmin Park, Vienna, VA (US); Hua Zhou, Vienna, VA (US)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,015

(22) Filed: Jan. 18, 2022

(65) Prior Publication Data

US 2022/0140950 A1 May 5, 2022

Related U.S. Application Data

(63) Continuation of application No. 16/101,309, filed on Aug. 10, 2018, now Pat. No. 11,233,606.
(Continued)

(51) Int. Cl.
*H04L 1/18* (2006.01)
*H04L 1/1812* (2023.01)
(Continued)

(52) U.S. Cl.
CPC ............ *H04L 1/1812* (2013.01); *H04L 1/188* (2013.01); *H04L 1/1822* (2013.01);
(Continued)

(58) Field of Classification Search
CPC ....... H04L 1/1854; H04L 1/1848; H04L 1/18; H04L 1/1812; H04L 1/1888;
(Continued)

(56) References Cited

U.S. PATENT DOCUMENTS 8,755,316 B2 6/2014 Aschan et al.
8,797,924 B2 8/2014 Tseng et al.
(Continued)

FOREIGN PATENT DOCUMENTS

| WO | 2015008967 A1 | 1/2015 |
| WO | 2016175007 A1 | 11/2016 |
| WO | 2018/082716 A1 | 5/2018 |
| WO | 2018/143876 A1 | 8/2018 |

OTHER PUBLICATIONS

3GPP TR 38 804 V1 0.0 (Mar. 2017); 3rd Generation Partnership Project; Technical Specification Group Radio Access Network; Study on New Radio Access Technology; Radio Interface Protocol Aspects(Release 14).
(Continued)

*Primary Examiner* — Sudesh M Patidar
(74) *Attorney, Agent, or Firm* — Arch & Lake LLP

(57) ABSTRACT

A wireless device comprises one or more processors and memory storing instructions. When executed by the one or more processors, the instructions cause the wireless device to receive messages comprising a downlink hybrid automatic repeat request (HARQ) round-trip-time (RTT) timer value expressed in units of symbols and a downlink discontinuous reception (DRX) retransmission timer value expressed in units of slot lengths, receive a downlink control information indicating downlink transmission of a transport block, start a downlink HARQ RTT timer with the downlink HARQ RTT timer value in response to receiving the downlink control information, start a downlink DRX retransmission timer with the downlink DRX retransmission timer
(Continued)

value in response to the downlink HARQ RTT timer expiring and the transport block not being successfully decoded, and monitor a downlink control channel while the downlink DRX retransmission timer is running.

20 Claims, 24 Drawing Sheets

Related U.S. Application Data

(60) Provisional application No. 62/543,849, filed on Aug. 10, 2017.

(51) Int. Cl.

| | | |
|---|---|---|
| *H04L 1/1867* | (2023.01) | |
| *H04L 1/1829* | (2023.01) | |
| *H04W 76/28* | (2018.01) | |
| *H04L 1/1822* | (2023.01) | |
| *H04L 43/0864* | (2022.01) | |
| *H04W 72/04* | (2023.01) | |
| *H04W 52/02* | (2009.01) | |
| *H04W 74/00* | (2009.01) | |

(52) U.S. Cl.
CPC .......... *H04L 1/1848* (2013.01); *H04L 1/1851* (2013.01); *H04L 1/1854* (2013.01); *H04L 1/1883* (2013.01); *H04L 1/1887* (2013.01); *H04L 43/0864* (2013.01); *H04W 76/28* (2018.02); *H04W 52/0229* (2013.01); *H04W 72/042* (2013.01); *H04W 74/006* (2013.01)

(58) Field of Classification Search
CPC ... H04L 1/1832; H04L 1/1851; H04L 1/1822; H04L 1/188; H04L 1/1883; H04L 1/1887; H04L 43/0852; H04L 43/0864; H04W 72/042; H04W 72/0406; H04W 76/20; H04W 76/048; H04W 76/28; H04W 74/006; H04W 52/0229
See application file for complete search history.

(56) References Cited

U.S. PATENT DOCUMENTS

| | | | |
|---|---|---|---|
| 9,674,874 | B2 | 6/2017 | Wang et al. |
| 9,768,944 | B2 | 9/2017 | Lee et al. |
| 10,638,535 | B2 | 4/2020 | Fan et al. |
| 2011/0292854 | A1 | 12/2011 | Terry et al. |
| 2015/0003311 | A1 | 1/2015 | Feuersaenger et al. |
| 2016/0192433 | A1 | 6/2016 | Deenoo et al. |
| 2016/0226631 | A1 | 8/2016 | Seo et al. |
| 2017/0353947 | A1 | 12/2017 | Ang et al. |
| 2018/0027424 | A1 | 1/2018 | Chen et al. |
| 2018/0063883 | A1 | 3/2018 | Nagaraja et al. |
| 2018/0070405 | A1 | 3/2018 | Yi et al. |
| 2018/0139772 | A1 | 5/2018 | Ozturk et al. |
| 2018/0145798 | A1 | 5/2018 | Suzuki et al. |
| 2018/0176934 | A1 | 6/2018 | Uchino et al. |
| 2019/0037637 | A1 | 1/2019 | Suzuki et al. |
| 2019/0306737 | A1 | 10/2019 | Kwak et al. |
| 2020/0162212 | A1 | 5/2020 | Liu et al. |
| 2021/0014791 | A1 | 1/2021 | Freda et al. |

OTHER PUBLICATIONS

International Search Report and Written Opinion dated Nov. 20, 2018, in PCT Application No. PCT/US2018/046349.
R1-1709970; 3GPP TSG RAN WG1 NR Ad Hoc Meeting; Qingdao, China, Jun. 27-30, 2017; Agenda Item: 5.1.3.3.5.1; Source: Huawei, HiSilicon; Title: HARQ feedback timing for NR; Document for: Discussion and decision.
R1-1711846; 3GPP TSG RAN WG1 NR Ad-Hoc Meeting; Qingdao, China, Jun. 27-30, 2017; Agenda item: 5.1.3.4.1.1; Way Forward on NR Carrier Aggregation; Huawei, HiSilicon, KT, CATR, MediaTek, Nokia, ASB, Ericsson, Intel, [LGE]. . . .
R2-1706369; 3GPP TSG RAN WG2 Meeting #NR AH2; Qingdao, China, Jun. 27-29, 2017; Source: CATT; Title: TTI/Numerology abstraction for MAC; Agenda Item: 10.3.1.7; Document for: Discussion and Decision.
R2-1706474; 3GPP TSG-RAN WG2 NR Adhoc; Qingdao, China, Jun. 27-30, 2017; update to R2-1705206; Agenda item: 10.3.1.10; Source: Huawei, HiSilicon; Title: DRX configuration in NR; Document for: Discussion and Decision.
Extended European Search Report, dated Dec. 1, 2021, in European Patent Application No. 21193780.0.
3GPP TS 36.300 V14.3.0 (Jun. 2017) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.211 V14.3.0 (Jun. 2017) Technical Specification—3rd Generation Partnership Project; Technical Specification Group Radio Access Network; Evolved Universal Terrestrial Radio Access (E-UTRA); Physical channels and modulation (Release 14).
3GPP TS 36.212 V14.3.0 (Jun. 2017)—Technical Specification—3rd Generation Partnership Project; Technical Specification Group Radio Access Network; Evolved Universal Terrestrial Radio Access (E-UTRA); Multiplexing and channel coding (Release 14).
3GPP TS 36.213 V14.3.0 (Jun. 2017)—Technical Specification—3rd Generation Partnership Project; Technical Specification Group Radio Access Network; Evolved Universal Terrestrial Radio Access (E-UTRA); Physical layer procedures (Release 14).
3GPP TS 36.321 V14.3.0 (Jun. 2017) Technical Specification 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V14.3.0 (Jun. 2017) Technical Specification 3rd Generation Partnership Project; Technical Specification Group Radio Access Network; Evolved Universal Terrestrial Radio Access (E-UTRA); Radio Resource Control (RRC); Protocol specification (Release 14).
R2-1704057—3GPP TSG-RAN2 #98—Hangzhou, China, May 15-19, 2017—Agenda Item: 10.3.1.9—Source OPPO—Title: DRX in NR—Document for: Discussion and Decision-.
R2-1704259—3GPP TSG-RAN WG2 Meeting #98—Hangzhou, China, May 15-19, 2017—Source: CATT—Title: DRX design in NR—Agenda Item: 10.3.1.9—Document for: Discussion and Decision.
R2-1704400—3GPP TSG-RAN WG2 #98 Tdoc—Hangzhou, P.R. of China, May 15-19, 2017—Agenda Item: 10.3.1—Source: Ericsson—Title: DRX enhancements for NR—Document for: Discussion, Decision.
R2-1704401, 3GPP TSG-RAN WG2 #98 Tdoc, Hangzhou, P.R. of China, May 15-19, 2017—Agenda Item: 10.3.1.9—Source: Ericsson—Title: DRX with Asynchronous HARQ—Document for: Discussion, Decision.
R2-1704402, 3GPP Tsg-Ran WG2 #98 Tdoc, Hangzhou, P.R. of China, May 15-19, 2017, Agenda Item 10.3.1.9, Source: Ericsson, Title: Wake-up signaling in C-DRX, Document for: Discussion, Decision.
R2-1704456, 3GPP TSG-RAN WG2 Meeting #98, Hangzhou, China, May 15-19, 2017, Agenda Item: 10.3.1.9, Souce: Samsung, Title: Way forward for NR C-DRX, Document for: Discussion.
R2-1704467, 3GPP TSG-RAN2 Meeting #98, Hangzhou, China, May 15-19, 2017, Agenda item: 10.3.1.9 (NR_newRAT-Core), Source: LG Electronics Inc., Title: Consideration for DRX in NR, Document for: Discussion and Decision.
R2-1704592, 3GPP TSG-RAN WG2 Meeting #98, Hangzhou, China, May 15-19, 2017, Source: vivo Title: Discussion on NR DRX configuration in RRC_Connected state, Agenda Item: 10.3.1. 9, Document for: Discussion and Decision.

(56) References Cited

OTHER PUBLICATIONS

R2-1704613, 3GPP TSG-RAN2 Meeting #98, Hangzhou, China, May 15-19, 2017, Agenda item: 10.1.3.7, Source: Huawei, HiSilicon, Title: DRX with Multiple Numerologies, Document for: Discussion and decision.
R2-1704668, 3GPP TSG-RAN WG2 Meeting#98, Hangzhou, China, May 15-19, 2017, Source: ZTE Title: Consideration on DRX, Agenda item: 10.3.1.9, Document for: Discussion and Decision.
R2-1704785, 3GPP TSG RAN WG2 Meeting # 98, Hangzhou, China, May 15-17, 2017, Agenda item: 10.3.1.9 Source: Intel Corporation, Title: C-DRX enhancement in NR, Document for: Discussion and decision.
R2-170xxxx, 3GPP TSG-RAN WG2 Meeting #98, Hangzhou, China May 15-19, 2017, Agenda item: 10.3.1.9 Source: Qualcomm Incorporated, Title: Configurations of C-DRX in NR, WID/SID: NR_newRAT-Core—Release 15, Document for: Discussion and Decision.
R2-170xxxx, 3GPP TSG-RAN WG2 Meeting #98, Hangzhou, China, May 15-19, 2017 (resubmission of R2-170568), Agenda item: 10.3.1.9, Source: Qualcomm Incorporated, Title: Wake-Up Schemes for DRX in NR WID/SID: NR_newRAT-Core—Release 15, Document for: Discussion and Decision.
R2-1704913, 3GPP TSG-RAN WG2 #98, Hangzhou, P.R. China, May 15-19, 2017, Agenda Item: 10.3.1.9, Source: InterDigital Inc, Title: C-DRX for Multiple Numerologies, Document for: Discussion, Decision.
R2-1704944, 3GPP TSG-RAN WG2 #98, Hangzhou, China, May 15-19, 2017, Agenda Item: 10.3.1.9, Souce: MediaTek Inc., Title: DRX configuration for NR, Document for: Discussion and decision.
R2-1705119 3GPP TSG-RAN2 WG2 Meeting #98, Hangzhou, China, May 15-19, 2017, Source: Huawei, HiSilicon, Title: UE power saving mechanism considering beamforming, Agenda Item: 10.3.1.9, Document for: Discussion and decision, Revision of: R2-1703461.
R2-1705206, 3GPP TSG-RAN WG2 #98, Hangzhou, Chine, May 15-19, 2017, Agenda item: 10.3.1.9, Source: Huawei, HiSilicon, Title: DRX configuration in NR, Document for: Discussion and decision.
R2-1705207, 3GPP TSG-RAN WG2 Meeting #98, Hangzhou, China, Apr. 15-19, 2017, Agenda item: 9.2.2, Source: Huawei, HiSilicon, Title: Numerology impacts on L2 timer for NR, Document for: Discussion and Decision.
R2-1705734, 3GPP TSG-RAN WG2 2017 RAN2#98 Meeting, Hangzhou, China, May 15-19, 2017 (Resubmission of R2-1700595), Agenda item: 10.3.1.9, Source: Samsung, Title: NR C-DRX operation with beamforming, Document for: Discussion & Decision.
R2-1706354, 3GPP TSG-RAN2 AH2, Qingdao, China, Jun. 27-29, 2017, Agenda Item: 10.3.1.10, Source: OPPO Title: DRX enhancement in NR, Document for: Discussion and Decision.
R2-1706371, 3GPP TSG-RAN WG2 Meeting #NR AH2, Qingdao, China, Jun. 27-29, 2017, Source: CATT Title: Further Considerations on NR DRX, Agenda Item: 10.3.1.10, Document for: Discussion and Decision.
R2-1706423, 3GPP TSG-RAN WG2 NR Ad-hoc#2 Meeting, Qingdao, China, Jun. 27-29, 2017, Agenda item: 10.3.1.10, Source: Samsung, Title: Power saving for wideband NR carrier, Document for: Discussion & Decision.
R2-1706424, 3GPP TSG-RAN WG2 NR Ad-hoc#2 Meeting, Qingdao, China, Jun. 27-29, 2017 (Resubmission of R2-1705600), Title: Draft LS to RAN1 on the time unit definition, Release: Rel-15, Work Item: FS_NR_newRAT Source: RAN WG2, To: RAN WG1.
R2-1706523, 3GPP TSG-RAN WG2 Meeting NR ad-hoc 2, Qingdao, China Jun. 27-29, 2017 (updated R2-1704899), Agenda item: 10.3.1.10, Source: Qualcomm Incorporated, Title: Multiple C-DRX Configurations for NR WID/SID: NR_newRAT-Core—Release 15, Document for: Discussion and Decision.
R2-1706524, 3GPP TSG-RAN WG2 Meeting NR ad-hoc 2, Qingdao, China, Jun. 27-29, 2017 (resubmission of R2-1704906), Agenda item: 10.3.1.10, Source: Qualcomm Incorporated, Title: Wake-Up Schemes for DRX in NR, WID/SID: NR_newRAT-Core—Release 15, Document for: Discussion and Decision.
R2-1706590, 3GPP TSG-RAN WG2 NR Adhoc #2, Qingdao, China, Jun. 27-29, 2017, Agenda item: 10.3.1.10 Source: Nokia, Alcatel-Lucent Shanghai Bell, Title: DRX for NR, WID/SID: NR_newRAT-Core—Release 15, Document for: Discussion and Decision.
R2-1706647, 3GPP TSG-RAN WG2 Meeting#NR_AdHoc#2, Qingdao, China, Jun. 27-29, 2017 Revision of R2-1704668, Source: ZTE, Title: Consideration on DRX, Agenda item: 10.3.1.10, Document for: Discussion and Decision.
R2-1706683, 3GPP TSG-RAN WG2 NR AH#2, Qingdao, P.R. China, Jun. 27-29, 2017 (Revision of R2-1704913), Agenda Item: 10.3.1.10, Source: InterDigital Inc., Title: C-DRX with Multiple Configurations, Document for: Discussion, Decision.
R2-1706684, 3GPP TSG-RAN WG2 NR AH#2, Qingdao, P.R. China, Jun. 27-29, 2017 (Revision of R2-1704914), Agenda Item: 10.3.1.10, Source: InterDigital Inc., Title: Power Savings for Carrier Aggregation in NR, Document for Discussion, Decision.
R2-1706750, 3GPP TSG-RAN2 Meeting NR AH#2, Qingdao, China, Jun. 27-29, 2017 Revision of R2-1704467, Agenda item: 10.3.1.10 (NR_newRAT-Core), Source: LG Electronics Inc., Title: Consideration for DRX in NR, Document for: Discussion and Decision.
R2-1706755, 3GPP TSG-RAN WG2 NR Ad Hoc, Qingdao, China, Jun. 27-29, 2017, Source: Potevio, Title: Discussion on DRX enhancements for NR, Agenda Item: 10.3.1.10, Document for: Discussion and Decision.
R2-1706823, 3GPP TSG-RAN WG2 Meeting NR#2, Qingdao, China, Jun. 27-29, 2017 (update of R2-1704456), Agenda Item: 10.3.1.10, Souce: Samsung, Title: Way forward for NR C-DRX, Document for: Discussion.
R2-1707026, 3GPP TSG RAN WG2 Meeting NR Ad hoc, Qingdao, China, Jun. 27-29, 2017 Revision of R2-1704785, Agenda item: 10.3.1.10, Source: Intel Corporation, Title: C-DRX enhancement in NR, Document for: Discussion and decision.
R2-1707073, 3GPP TSG-RAN WG2 NR Ad Hoc, Qingdao, China, Jun. 27-29, 2017 (revision of R2-1704592), Source: vivo, Title: Discussion on NR DRX configuration in RRC_Connected state, Agenda Item: 10.3.1.10, Document for: Discussion and Decision.
R2-1707122, 3GPP TSG-RAN WG2 #98-AH Tdoc, Qingdao, P.R. of China, Jun. 27-29, 2017, Agenda Item: 10.3.1.10, Source: Ericsson, Title: DRX enhancements for NR, Document for: Discussion, Decision.
R2-1707123, 3GPP TSG-RAN WG2 #98-AH Tdoc, Qingdao, P.R. of China, Jun. 27-29, 2017 Resubmission of R2-1704401, Agenda Item: 10.3.1.10, Source: Ericsson, Title: DRX with Asynchronous HARQ, Document for: Discussion, Decision.
R2-1707124, 3GPP TSG-RAN WG2 #98-AH Tdoc, Qingdao, P.R. of China, Jun. 27-29, 2017 Update of R2-1704402, Agenda Item: 10.3.1.10, Source: Ericsson, Title: DRX with short on-duration and Wake-up signaling, Document for: Discussion, Decision.
3GPP TSG RAN WG2 Meeting NR#2 R2-1707396; Qingdao, China, Jun. 27-29, 2017; Agenda item: 10.3.1.10 Source: National Taiwan University; Title: Beam Operation Impact for DRX in NR; Document for: Discussion and decision.
3GPP TS 36.321 V13.6.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification; (Release 13).

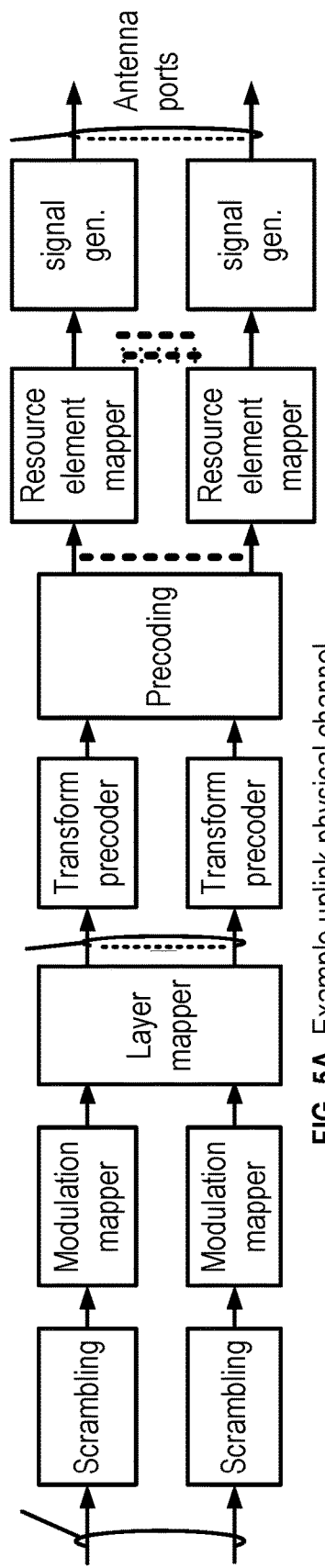
FIG. 5A Example uplink physical channel
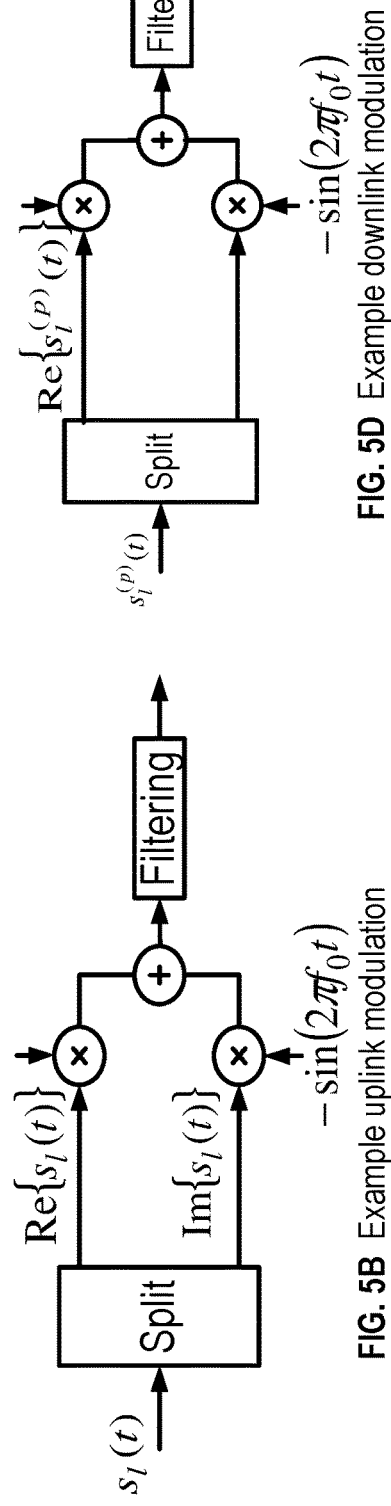
FIG. 5B Example uplink modulation
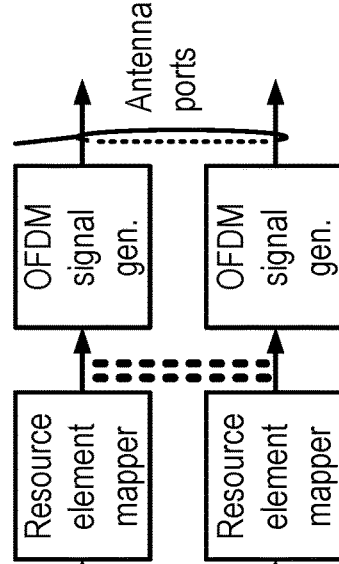
FIG. 5D Example downlink modulation
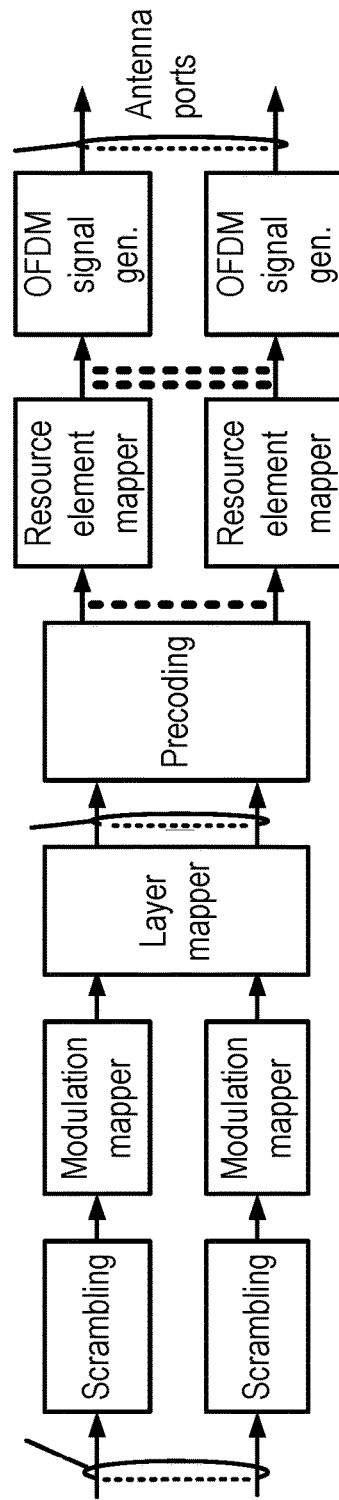
FIG. 5C Example downlink physical channel

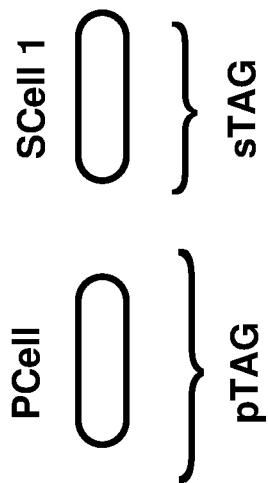
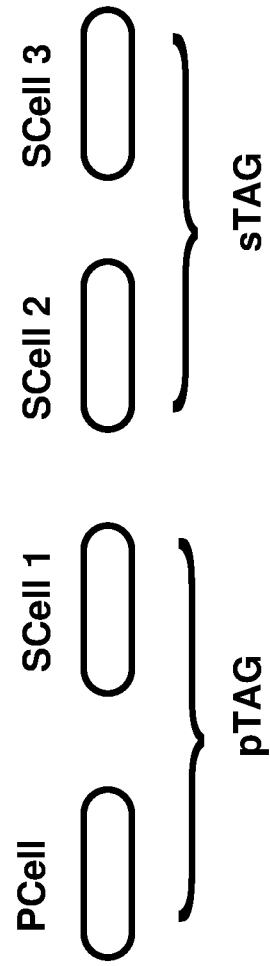
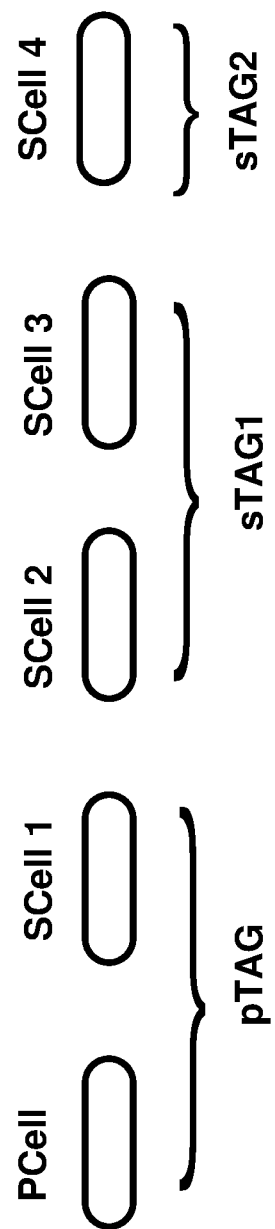
FIG. 8

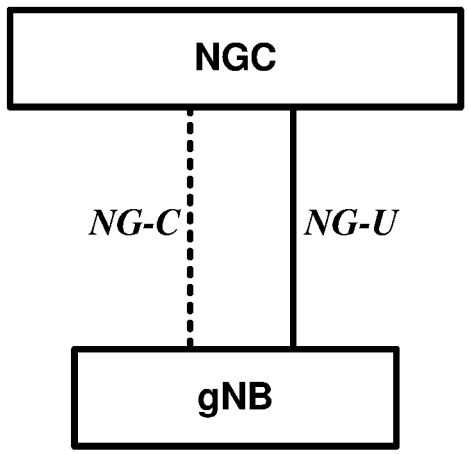
FIG. 10A  gNB connected to NGC
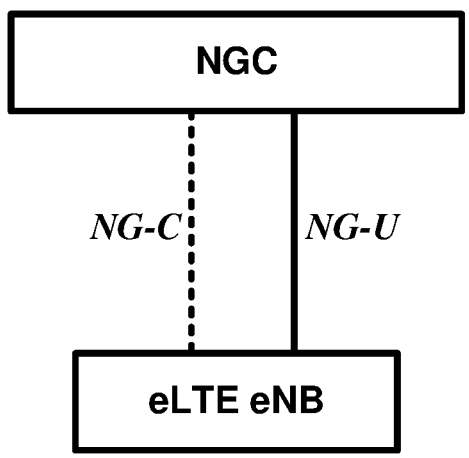
FIG. 10B  eLTE eNB connected to NGC

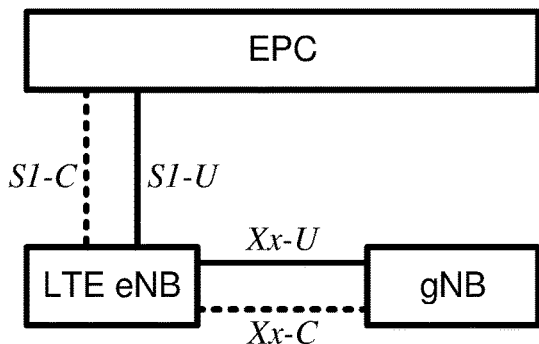

FIG. 11A LTE eNB connected to EPC with non-standalone gNB.
gNB user plane connected to EPC via LTE eNB.

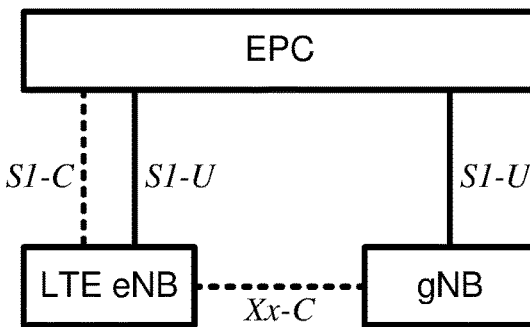

FIG. 11B LTE eNB connected to EPC with non-standalone gNB.
gNB user plane connected to EPC directly.

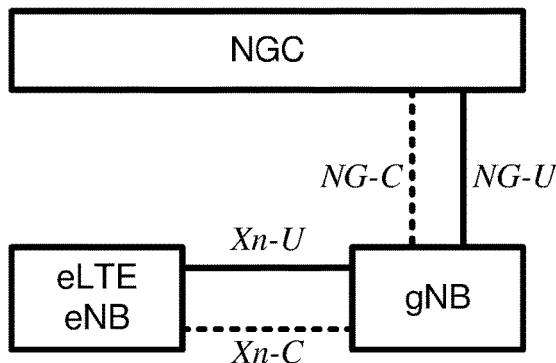

FIG. 11C gNB connected to NGC with non-standalone eLTE eNB.
eLTE eNB user plane connected to NGC via gNB.

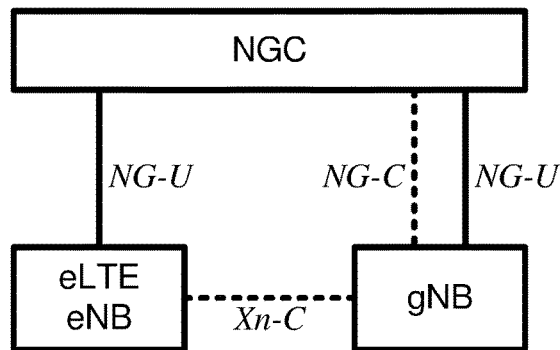

FIG. 11D gNB connected to NGC with non-standalone eLTE eNB.
eLTE eNB user plane connected to NGC directly.

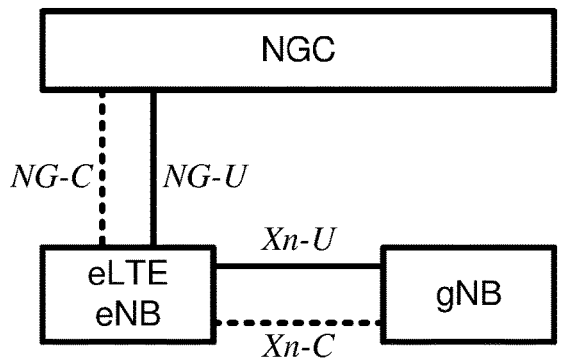

FIG. 11E eLTE eNB connected to NGC with non-standalone gNB.
gNB user plane connected to NGC via eLTE eNB.

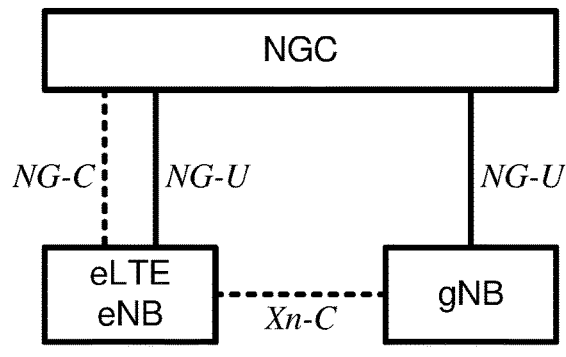

FIG. 11F eLTE eNB connected to NGC with non-standalone gNB.
gNB user plane connected to NGC directly.

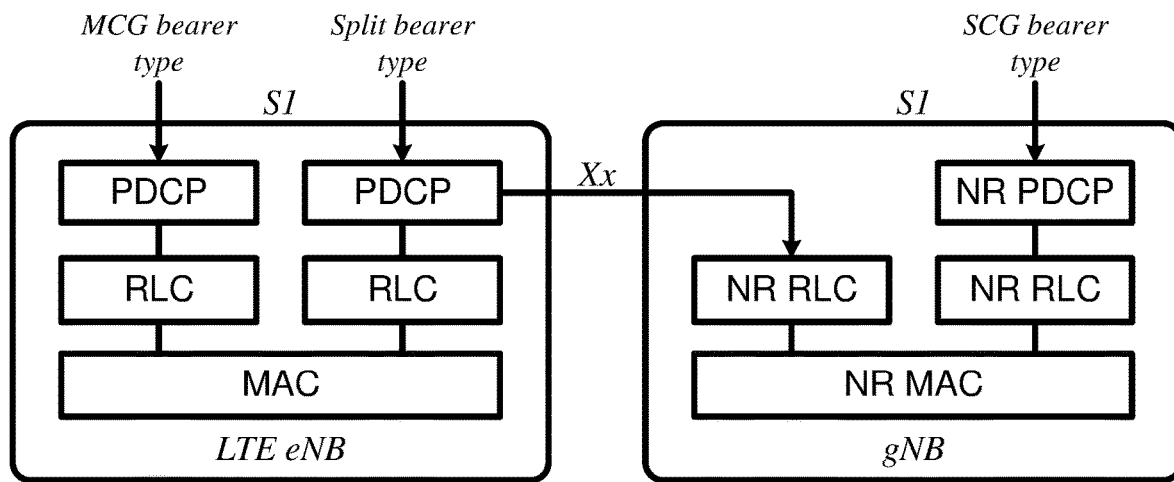
FIG. 12A Radio protocol architecture for split bearer and SCG bearer. LTE eNB connected to EPC with non-standalone gNB.
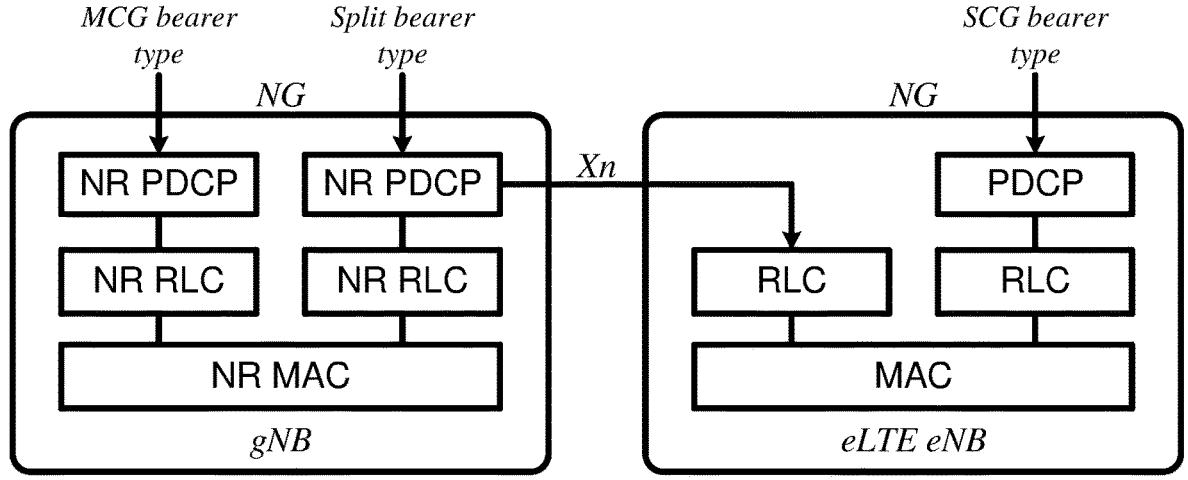
FIG. 12B Radio protocol architecture for split bearer and SCG bearer. gNB connected to NGC with non-standalone eLTE eNB.
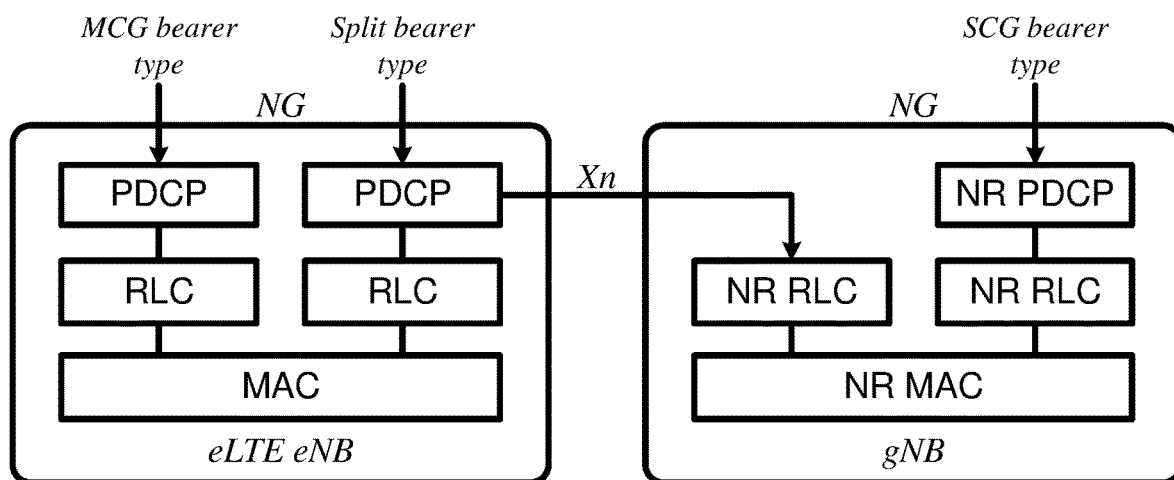
FIG. 12C Radio protocol architecture for split bearer and SCG bearer. eLTE eNB connected to NGC with non-standalone gNB.

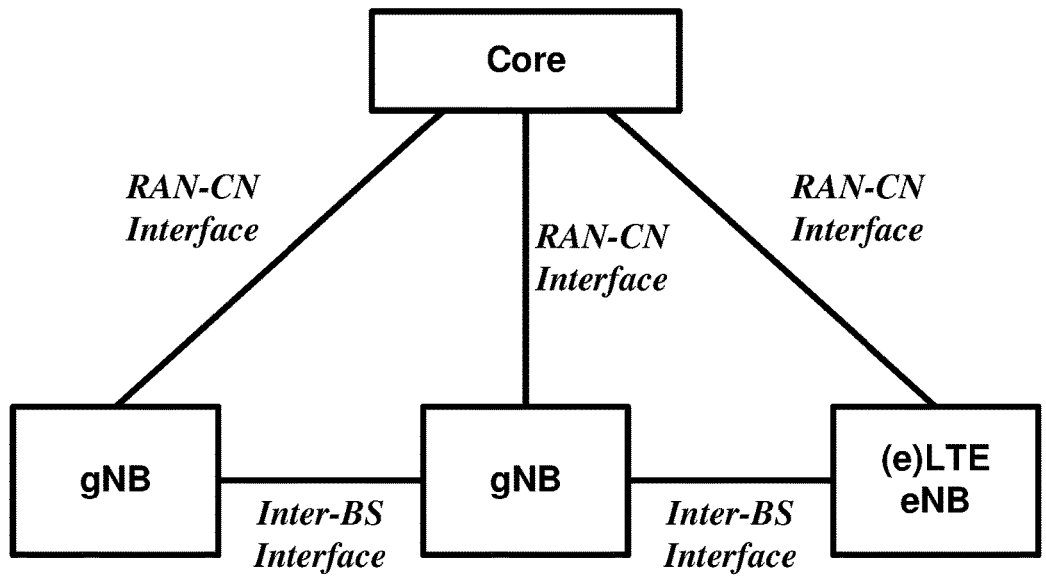
FIG. 13A Non-centralized deployment
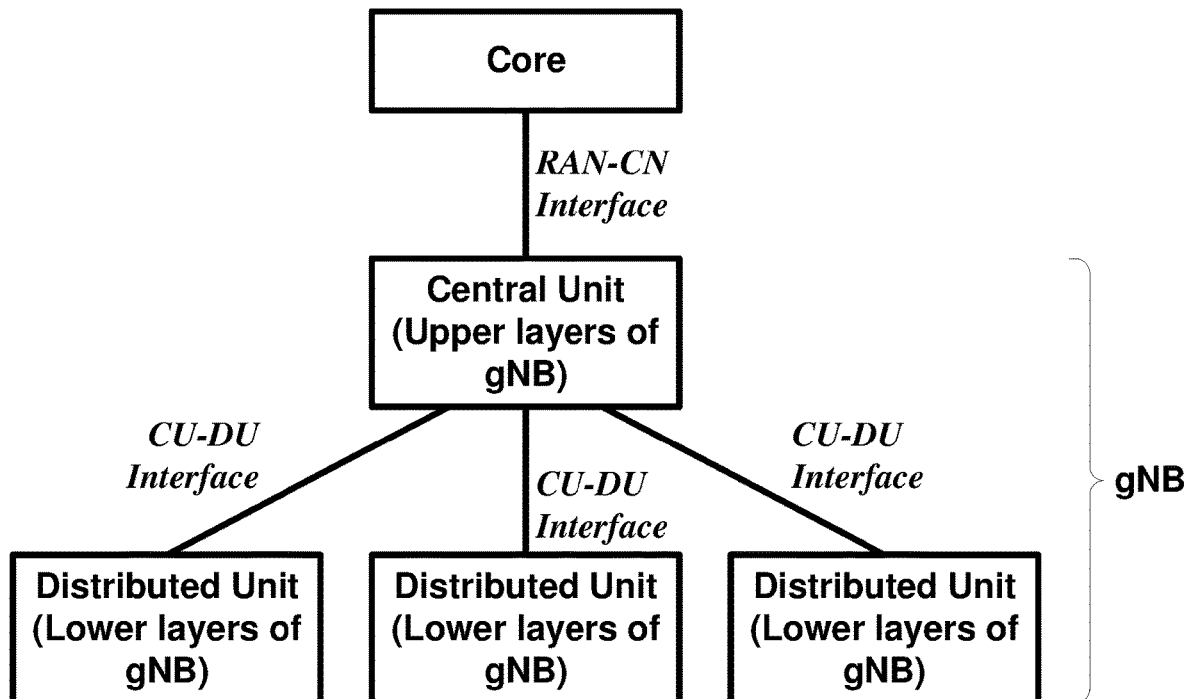
FIG. 13B Centralized deployment

```
┌─────────────────────────────────────────────────────────────┐
│  Receive, by a wireless device, message(s) comprising: a 1st value │
│  for a downlink HARQ RTT timer; and a 2nd value for a DRX   │
│                    retransmission timer                      │
│                           2110                               │
└─────────────────────────────────────────────────────────────┘
                              │
                              ▼
┌─────────────────────────────────────────────────────────────┐
│    Receive a downlink control information indicating downlink│
│              transmission of a transport block               │
│                           2120                               │
└─────────────────────────────────────────────────────────────┘
                              │
                              ▼
┌─────────────────────────────────────────────────────────────┐
│  Start the downlink HARQ RTT timer with the 1st value in response │
│  to receiving the downlink control information, where the 1st value │
│              indicates a 1st number of symbols               │
│                           2130                               │
└─────────────────────────────────────────────────────────────┘
                              │
                              ▼
┌─────────────────────────────────────────────────────────────┐
│  Start the downlink DRX retransmission timer with the 2nd value in │
│    response to the downlink HARQ RTT timer expiring and the  │
│  transport block not being successfully decoded, where the 2nd │
│           value indicates a 2nd number of slot lengths       │
│                           2140                               │
└─────────────────────────────────────────────────────────────┘
                              │
                              ▼
┌─────────────────────────────────────────────────────────────┐
│   Monitor a downlink control channel while the downlink DRX  │
│                retransmission timer is running               │
│                           2150                               │
└─────────────────────────────────────────────────────────────┘
```

FIG. 21

WIRELESS DEVICE CONTROL CHANNEL MONITORING

CROSS-REFERENCE TO RELATED APPLICATIONS

This application is a continuation of U.S. patent application Ser. No. 16/101,309, filed Aug. 10, 2018, which claims the benefit of U.S. Provisional Application No. 62/543,849, filed Aug. 10, 2017, which is hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 10A and FIG. 10B are example diagrams for interfaces between a 5G core network (e.g. NGC) and base stations (e.g. gNB and eLTE eNB) as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 12A, FIG. 12B, and FIG. 12C are example diagrams for radio protocol structures of tight interworking bearers as per an aspect of an embodiment of the present invention.

FIG. 13A and FIG. 13B are example diagrams for gNB deployment scenarios as per an aspect of an embodiment of the present invention.

FIG. 21 is a flow diagram of an aspect of an embodiment of the present disclosure.

DETAILED DESCRIPTION OF EMBODIMENTS

Figure 1:
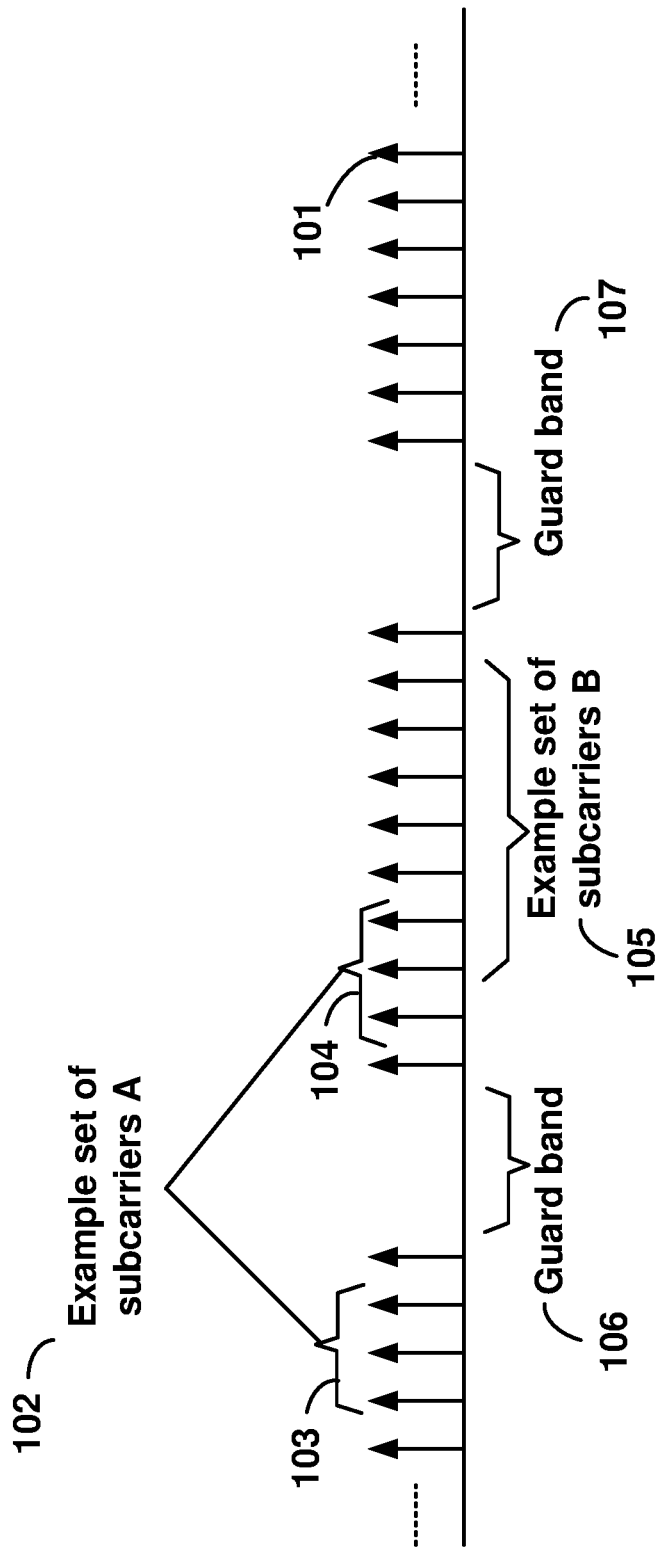
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication system.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
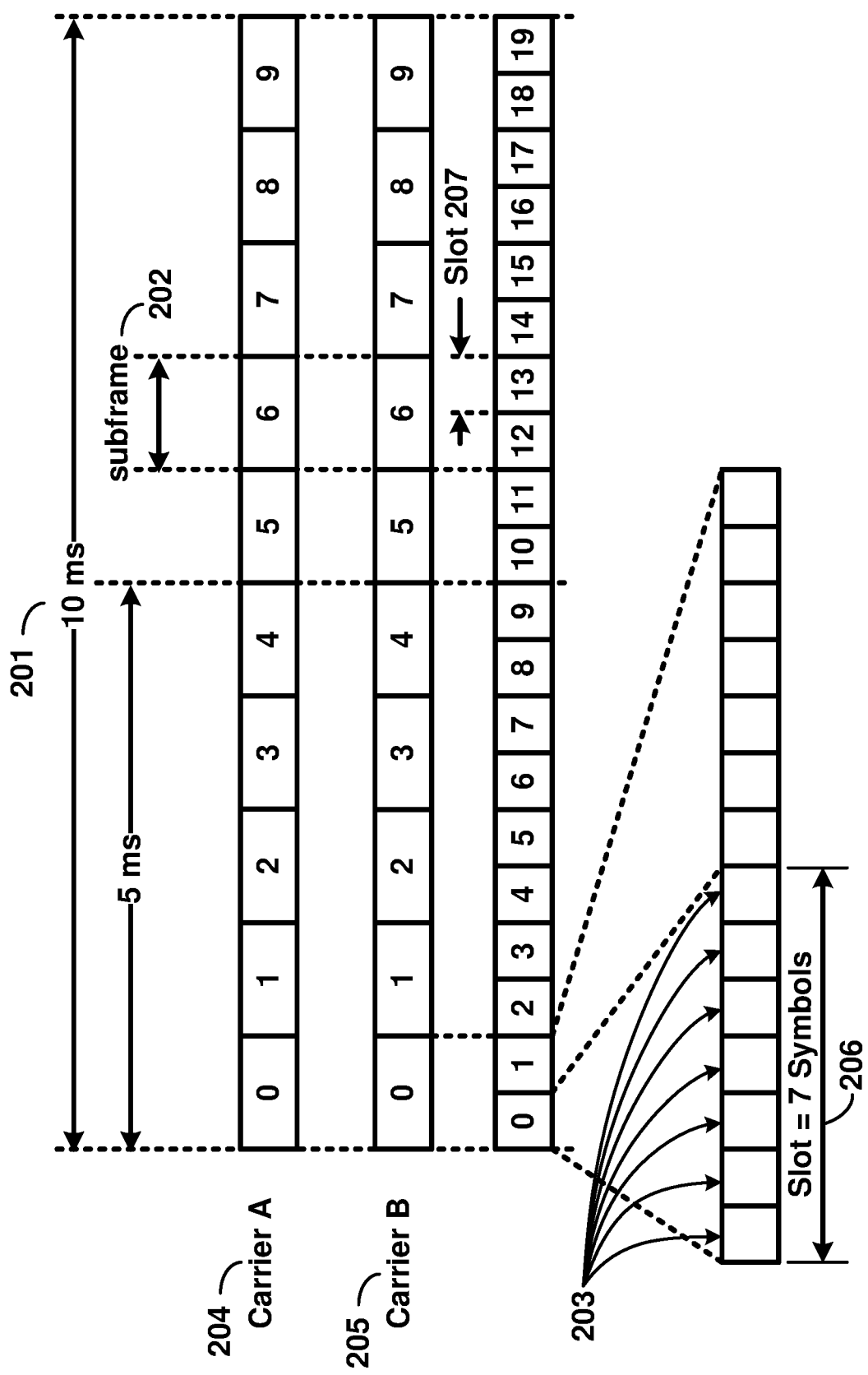
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
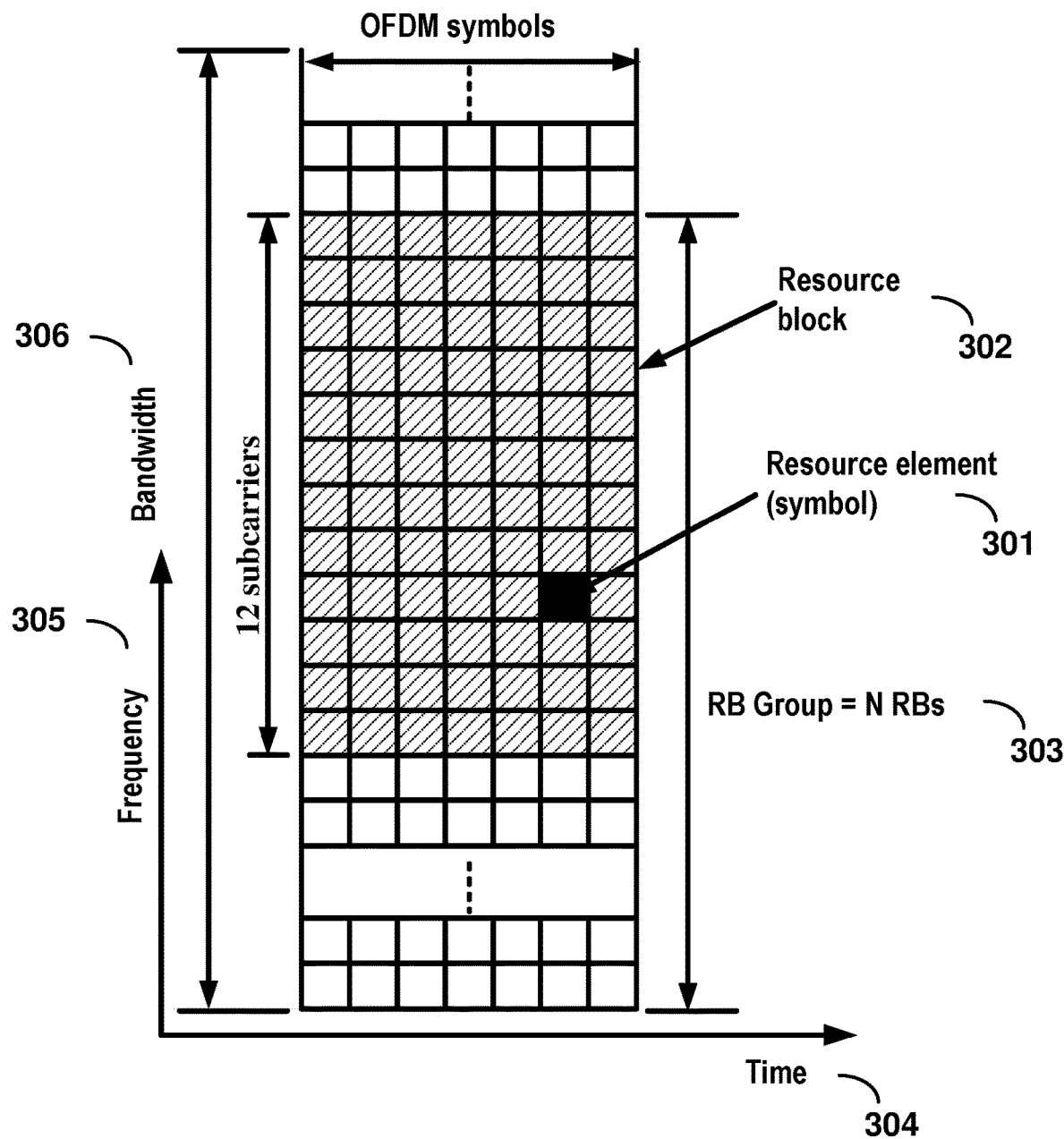
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
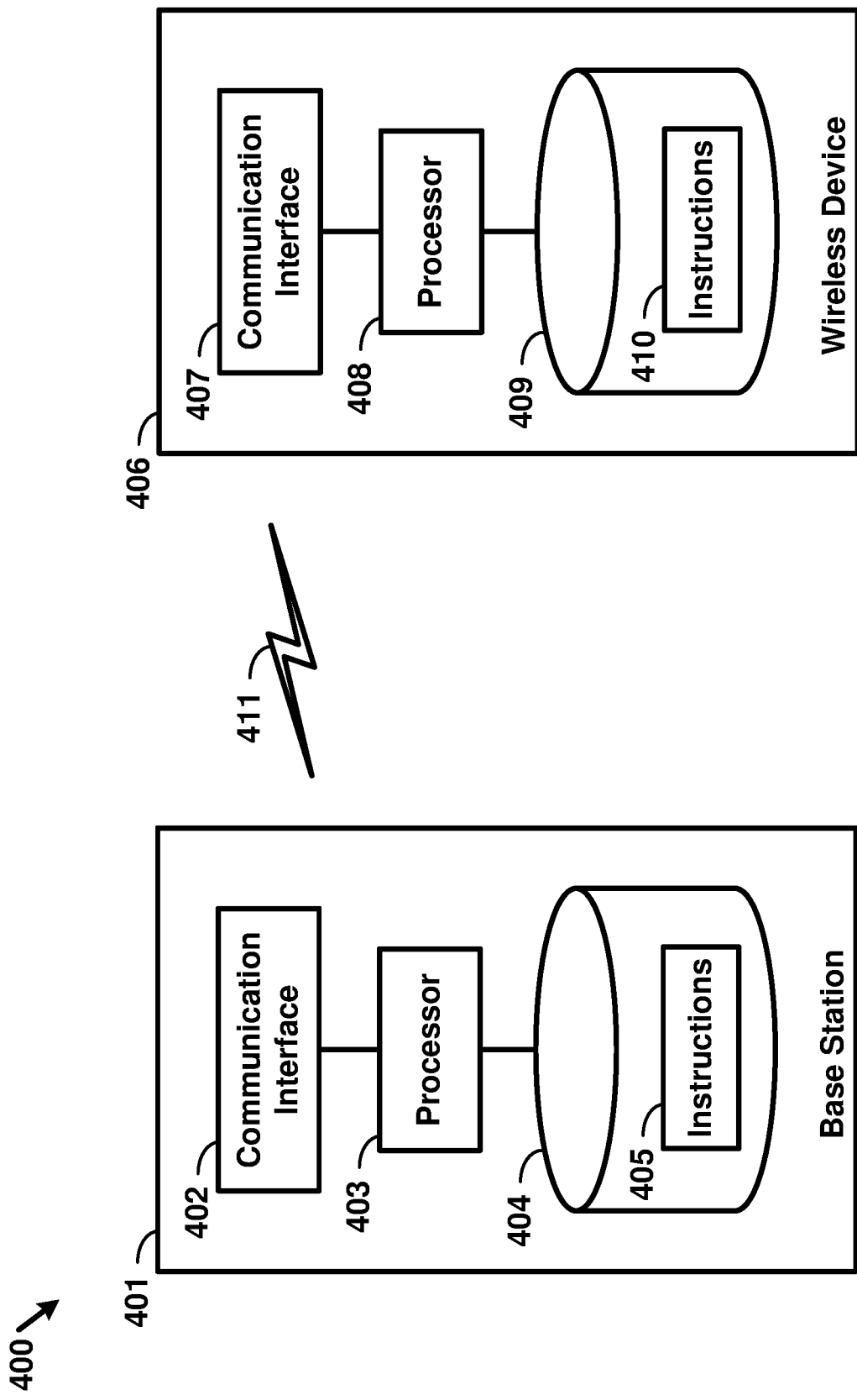
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
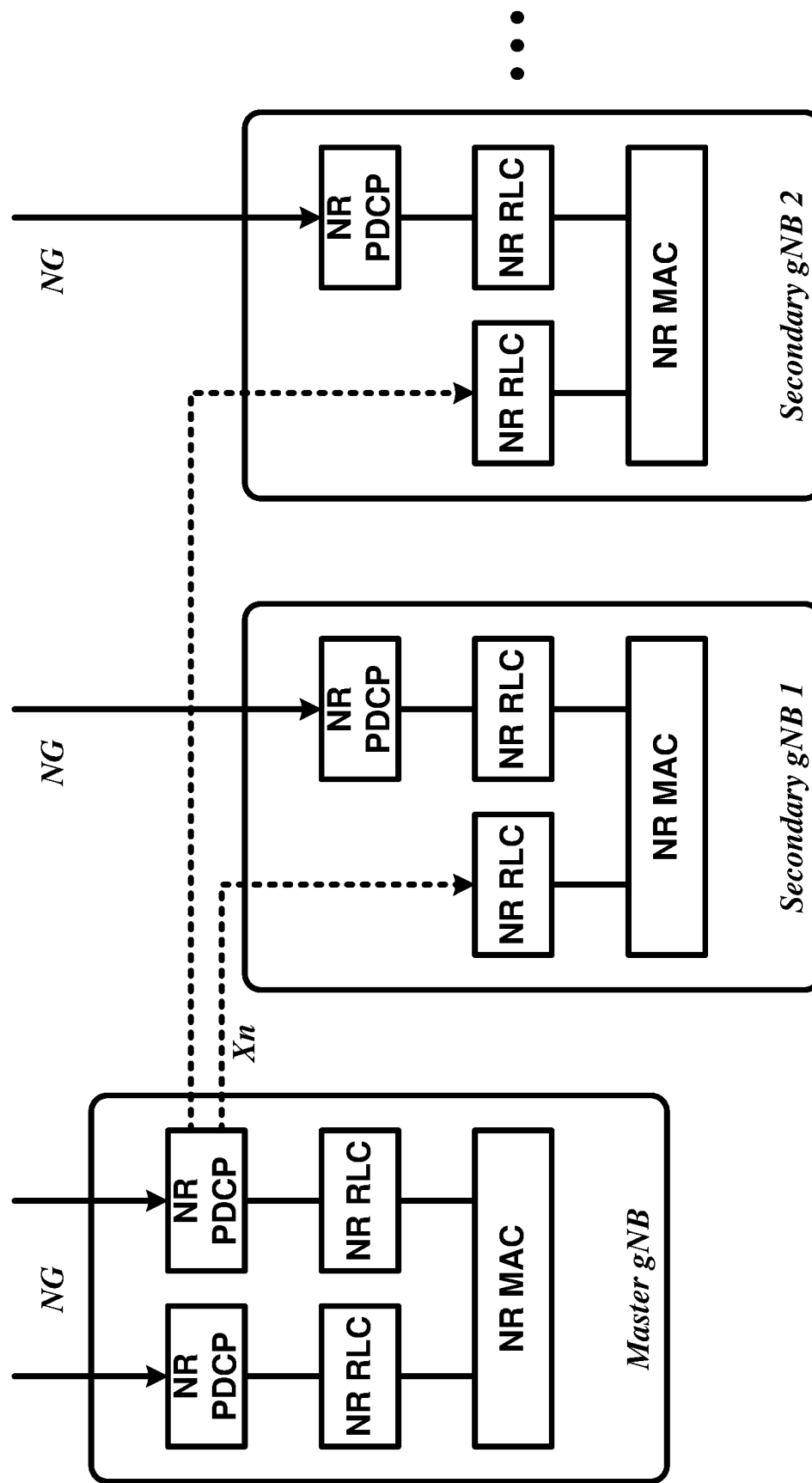
FIG. 6 is an example diagram for a protocol structure with multi-connectivity as per an aspect of an embodiment of the present invention.
Figure 7:
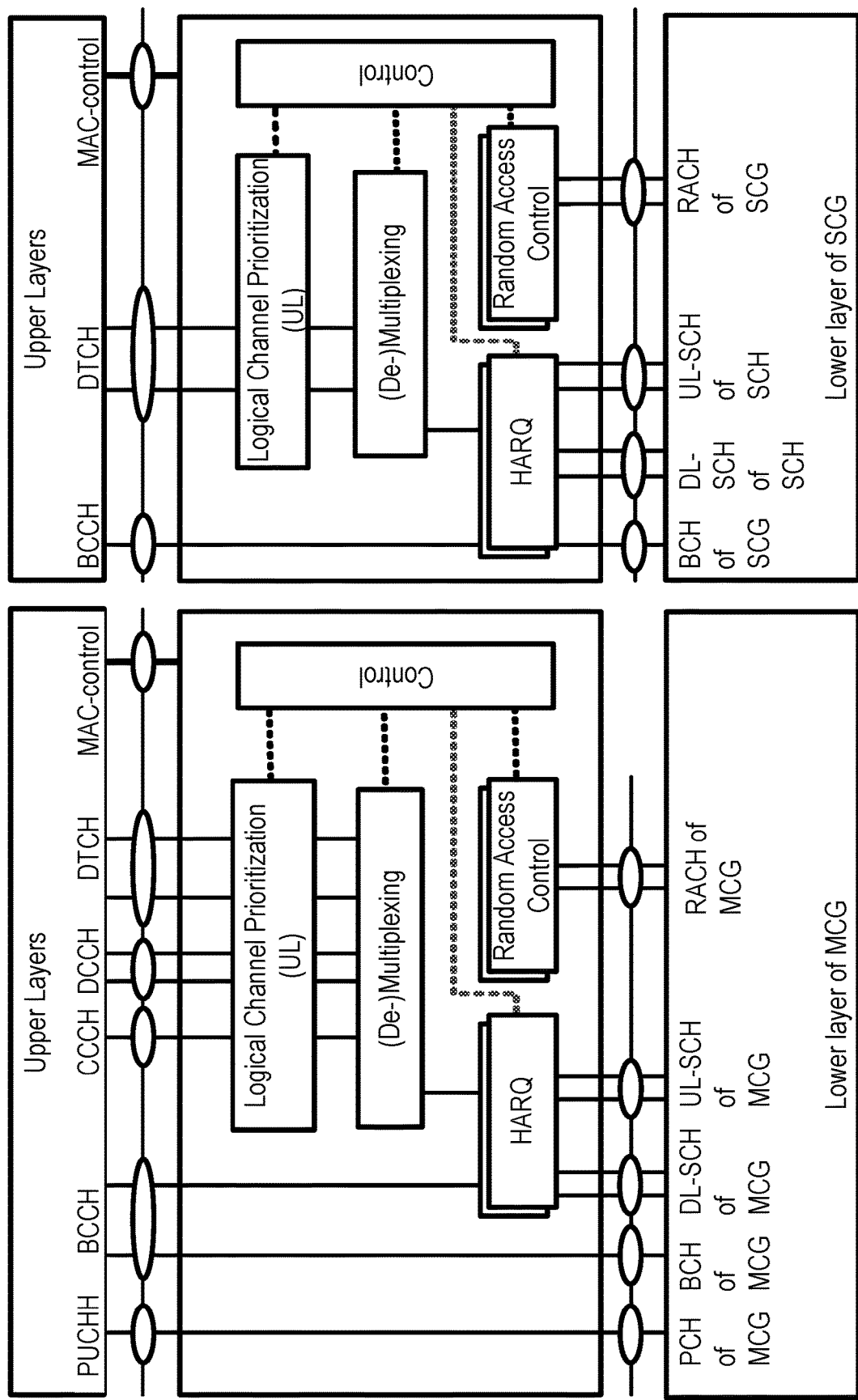
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
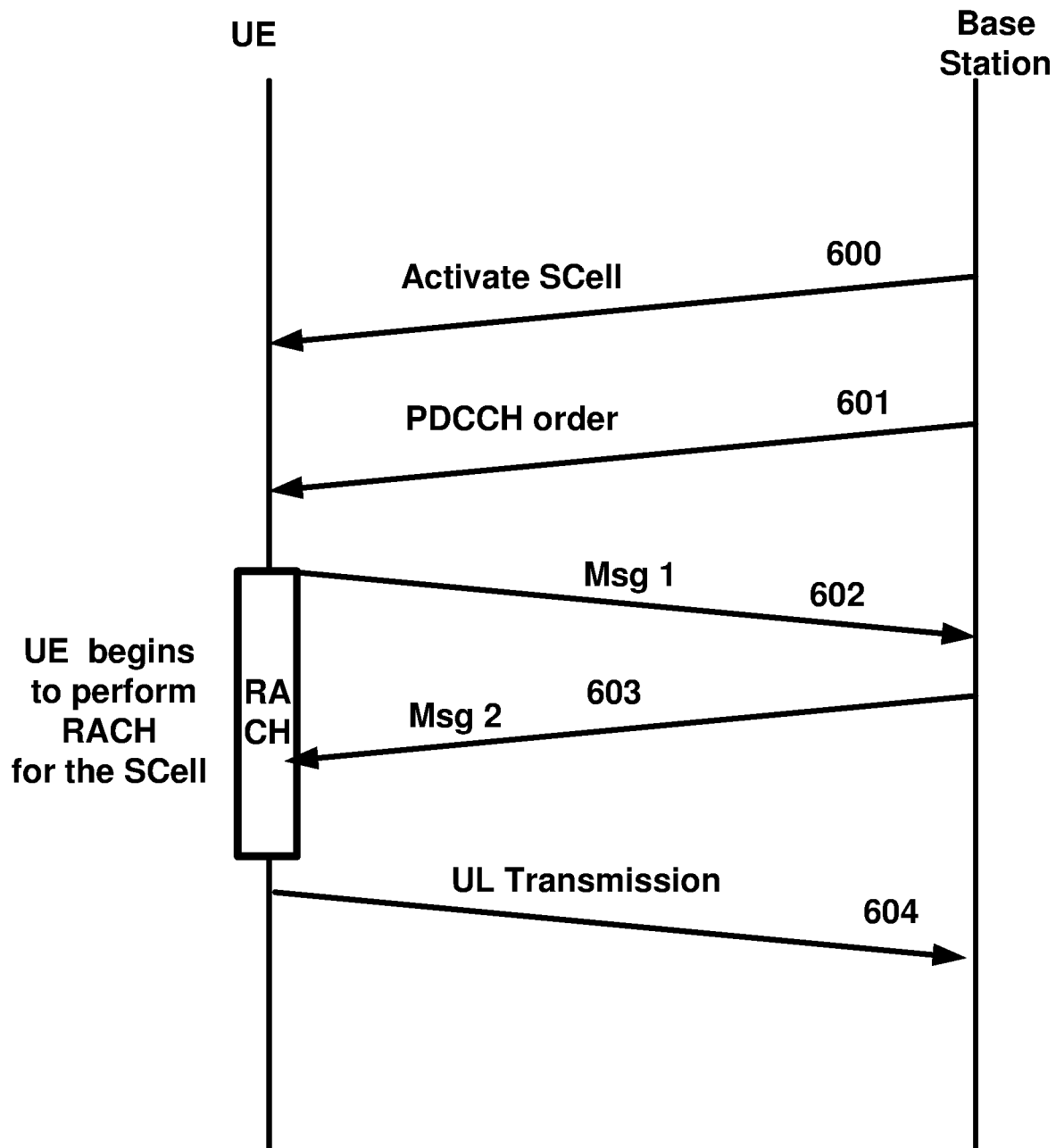
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RB s, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
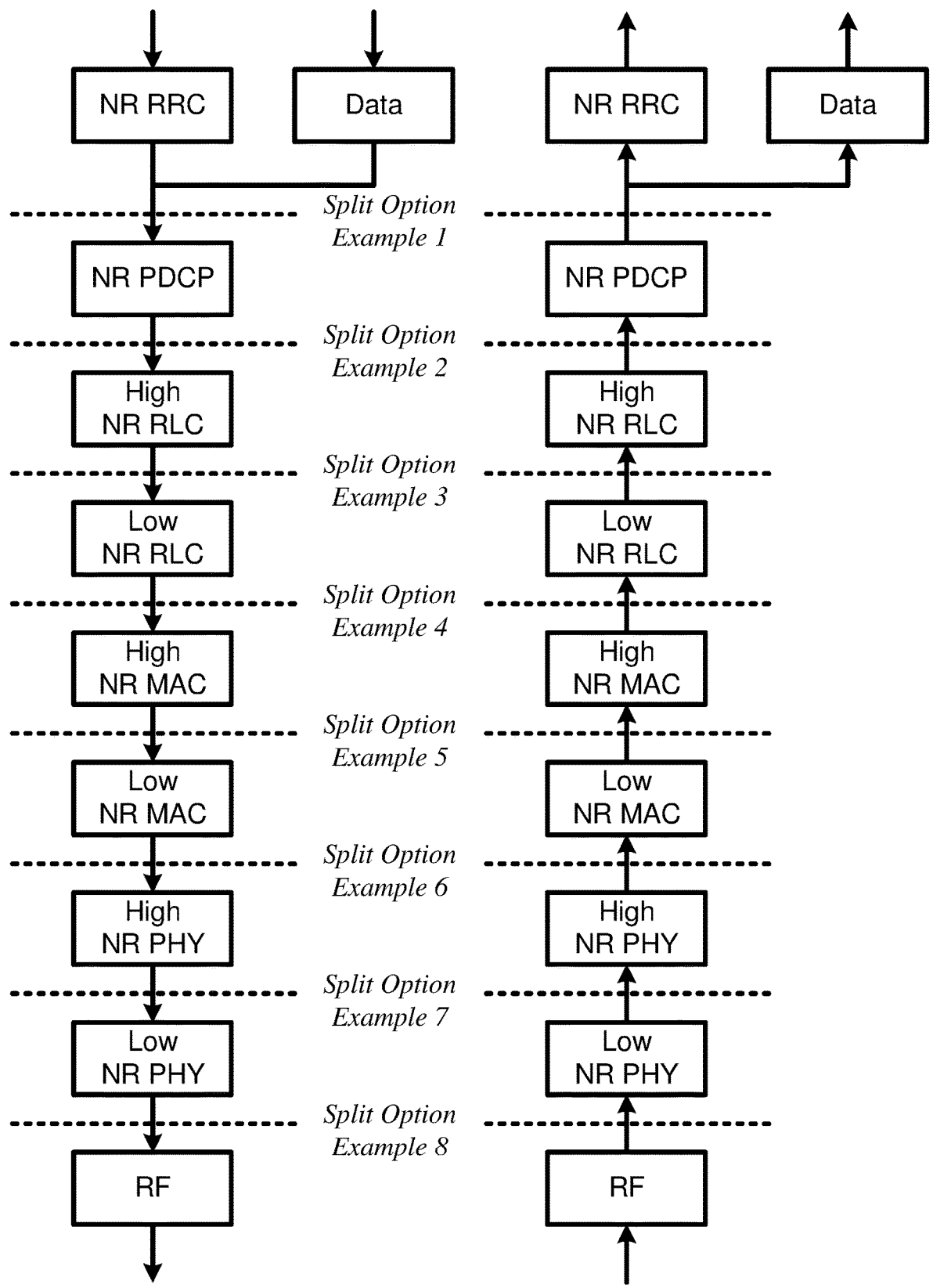
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one or more messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra-reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/numerologies. In an example, a logical channel may not be mapped to one or more of the plurality of TTIs/numerologies. In an example, a logical channel corresponding to a URLLC bearer may be mapped to one or more first TTIs and a logical corresponding to an eMBB application may be mapped to one or more second TTIs, wherein the one or more first TTIs may have shorter duration than the one or more second TTIs. In an example, the plurality of TTIs/numerologies may be pre-configured at the wireless device. In an example, the one or more messages may comprise the configuration parameters of the plurality of TTIs/numerologies. In an example, a base station may transmit a grant/DCI to a wireless device, wherein the grant/DCI may comprise indication of a cell and/or a TTI/numerology that the wireless device may transmit data. In an example, a first field in the grant/DCI may indicate the cell and a second field in the grant/DCI may indicate the TTI/numerology. In an example, a field in the grant/DCI may indicate both the cell and the TTI/numerology.

In an example, the one or more messages may comprise a logical channel group identifier for one or more of the plurality of the logical channels. In an example, one or more of the plurality of logical channels may be assigned a logical channel group identifier n, $0 \le n \le N$ (e.g., N=3, or 5, or 7, or 11 or 15, etc.). In an example, the one or more of the plurality of logical channels with the logical channel group identifier may be mapped to a same one or more TTIs/numerologies. In an example, the one or more of the plurality of logical channels with the logical channel group identifier may only be mapped to a same one or more TTIs/numerologies. In an example, the one more of the plurality of logical channels may correspond to a same application and/or QoS requirements. In an example, a first one or more logical channels may be assigned logical channel identifier(s) and logical channel group identifier(s) and a second one or more logical channels may be assigned logical channel identifier(s). In an example, a logical channel group may comprise of one logical channel.

In an example, the one or more messages may comprise one or more first fields indicating mapping between the plurality of logical channels and the plurality of TTIs/numerologies and/or cells. In an example, the one or more first fields may comprise a first value indicating a logical channel is mapped to one or more first TTI duration shorter than or equal to the first value. In an example, the one or more first fields may comprise a second value indicating a logical channel is mapped to one or more second TTI durations longer than or equal to the second value. In an example, the one or more first fields may comprise and/or indicate one or more TTIs/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/numerology and/or cell. In an example, if a value of 0 in the bitmap associated with a logical channel may indicate that the logical channel is not mapped to a corresponding TTI/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/numerologies and/or cells.

In an example, a first logical channel may be assigned at least a first logical channel priority. In an example, the first logical channel may be assigned one or more logical channel priorities for one or more TTIs/numerologies. In an example, the first logical channel may be assigned a logical channel priority for each of the plurality of TTIs/numerologies. In an example, a logical channel may be assigned a logical channel priority for each of one or more of the plurality of TTIs/numerologies. In an example, a logical channel may be assigned a logical channel priority for each of one or more TTIs/numerologies wherein the logical channel is mapped to the each of the one or more TTIs/numerologies. In an example, the one or more messages may comprise one or more second fields indicating priorities of a logical channel on one or more TTIs/numerologies. In an example, the one or more second fields may comprise one or more sequences indicating priorities of a logical channel on one or more TTIs/numerologies. In an example, the one or more second fields may comprise a plurality of sequences for the plurality of logical channels. A sequence corresponding to a logical channel may indicate the priorities of the logical channel on the plurality of TTIs/numerologies/cells or one or more of the plurality of TTIs/numerologies/cells. In an example, the priorities may indicate mapping between a logical channel and one or more TTIs/numerologies. In an example, a priority of a logical channel with a given value (e.g., zero or minus infinity or a negative value) for a TTI/numerology may indicate that the logical channel is not mapped to the TTI/numerology. In an example, sizes of the sequence may be variable. In an example, a size of a sequence associated with a logical channel may be a number of TTIs/numerologies to which the logical channel is mapped. In an example, the sizes of the sequence may be fixed, e.g., the number of TTIs/numerologies/cells.

In an example, a TTI/numerology for a grant (e.g., as indicated by the grant/DCI) may not accept data from one or more logical channels. In an example, the one or more logical channels may not be mapped to the TTI/numerology indicated in the grant. In an example, a logical channel of the one or more logical channels may be configured to be mapped to one or more TTIs/numerologies and the TTI/numerology for the grant may not be among the one or more TTIs/numerologies. In an example, a logical channel of the one or more logical channels may be configured with a max-TTI parameter indicating that the logical channel may not be mapped to a TTI longer than max-TTI, and the grant may be for a TTI longer than max-TTI. In an example, a logical channel may be configured with a min-TTI parameter indicating that the logical channel may not be mapped to a TTI shorter than min-TTI, and the grant may be for a TTI shorter than min-TTI. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology. In an example, the logical channel may not be configured with an upper layer configuration parameter laa-allowed and the cell may be an LAA cell.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/TTIs, priorities of a logical channel on the one or more numerologies/TTIs, the numerology/TTI indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

In an example embodiment, a HARQ feedback timing may be indicated in a DCI scheduling a downlink transmission (e.g., a PDSCH). In an example, DCI may comprise a field with a value/number/integer that indicates the time between the downlink transmission and HARQ feedback corresponding to the downlink transmission (e.g., ACK or NACK). The HARQ feedback may be transmitted on a PUCCH and/or PUSCH. In an example, HARQ feedback corresponding to a plurality of transport blocks may be transmitted on a PUSCH and/or PUCCH. In an example, the plurality of transport blocks may be associated with a same numerology/TTI. In an example, at least one of the plurality of transport blocks may be associated with a numerology/TTI different from numerologies/TTIs of the other transport blocks in the plurality of transport blocks.

In an example embodiment, a wireless device may monitor a plurality of PDCCH candidates in a common search space (e.g., in a primary cell) and UE-specific search space (e.g., in secondary cell). In an example, the wireless device may receive a PDCCH/EPDCCH on a first cell scheduling the wireless device (e.g., for PUSCH and/or PDSCH transmission) on the first cell (e.g., self-carrier scheduling). In an example, the PDCCH/EPDCCH received on the first cell may schedule the wireless device on a second cell (e.g., cross-carrier scheduling). In an example, for the cross-carrier scheduling, PDCCH and a scheduled PDSCH may same and/or different numerologies. In an example, for self-carrier scheduling, a PDCCH and the scheduled PDSCH may have a same or different numerology. In an example, for self- and/or cross-carrier scheduling, PDCCH and the scheduled PUSCH may have a same or different numerology.

In an example embodiment, when numerology between PDCCH and the scheduled transmission is different, the time granularity indicated in the DCI for the timing relationship between the end of the PDCCH and the corresponding scheduled transmission may be based on the numerology of the scheduled transmission.

In an example embodiment, HARQ feedback of a plurality of downlink component carriers with a same or different numerology may be transmitted together. In an example embodiment, a time granularity of HARQ feedback transmission indicated in a DCI scheduling a PDSCH may be based on a numerology of a PUCCH transmission. In an example, the PUCCH may correspond to the PDSCH (e.g., based on the numerology of PDSCH and/or content of TB(s) in PDSCH and/or service type of TB(s) and/or size of TB(s) in PDSCH etc.).

In an example embodiment, DRX operation may be used by a wireless device to improve UE battery lifetime. In an example, in DRX, UE may discontinuously monitor downlink control channel, e.g., PDCCH/EPDCCH. In an example, the base station may configure DRX with a set of DRX parameters, e.g., using RRC configuration. The DRX parameters may be selected based on the application type such that power and resource savings are maximized. In an example, in response to DRX being configured/activated, there may be an extended delay in receiving data as, the UE may be in DRX Sleep/Off state at the time of data arrival at the base station and the base station would need to wait until the UE transitions to the DRX ON state. The base station may select the DRX parameters such that the packet delay is minimized and power saving is maximized.

In an example, during a DRX mode, the UE may power down most of its circuitry when there are no packets to be received. During this time UE listens to the downlink (DL) occasionally which is called DRX Active state whereas the time during which UE doesn't listen PDCCH is called DRX Sleep state.

In an example, DRX may be beneficial to the base station. In an example, if DRX is not configured, the wireless device may be transmitting periodic CSI and/or SRS frequently (e.g., based on the configuration). With DRX, during DRX OFF periods, the UE may not transmit periodic CSI and/or SRS. The base station may assign these resources to the other UEs to maximize resource utilization.

An example DRX configuration information element is shown below. The time granularity for legacy DRX timers may be in terms PDCCH subframes (e.g., indicated as psf in the DRX configurations) in legacy DRX procedures. Example embodiments may enhance the DRX configuration for determining time granularity of DRX timers for example, based on a numerology and/or TTI.

```
DRX-Config ::=              CHOICE {
    release                 NULL,
    setup                   SEQUENCE {
        onDurationTimer         ENUMERATED {
                                    psf1, psf2, psf3, psf4, psf5, psf6,
                                    psf8, psf10, psf20, psf30, psf40,
                                    psf50, psf60, psf80, psf100,
                                    psf200},
        drx-InactivityTimer     ENUMERATED {
                                    psf1, psf2, psf3, psf4, psf5, psf6,
                                    psf8, psf10, psf20, psf30, psf40,
                                    psf50, psf60, psf80, psf100,
                                    psf200, psf300, psf500, psf750,
                                    psf1280, psf1920, psf2560,
                                    psf0-v1020, spare9, spare8, spare7,
                                    spare6, spare5, spare4, spare3,
                                    spare2, spare1},
        drx-RetransmissionTimer ENUMERATED {
                                    psf1, psf2, psf4, psf6, psf8, psf16,
                                    psf24, psf33},
        longDRX-CycleStartOffset CHOICE {
            sf10                    INTEGER(0..9),
            f20                     INTEGER(0..19),
            sf32                    INTEGER(0..31),
            sf40                    INTEGER(0..39),
            sf64                    INTEGER(0..63),
            sf80                    INTEGER(0..79),
            sf128                   INTEGER(0..127),
```

-continued

```
            sf160                   INTEGER(0..159),
            sf256                   INTEGER(0..255),
            sf320                   INTEGER(0..319),
            sf512                   INTEGER(0..511),
            sf640                   INTEGER(0..639),
            sf1024                  INTEGER(0..1023),
            sf1280                  INTEGER(0..1279),
            sf2048                  INTEGER(0..2047),
            sf2560                  INTEGER(0..2559)
        },
        shortDRX                SEQUENCE {
            shortDRX-Cycle          ENUMERATED {
                                        sf2, sf5, sf8, sf10, sf16, sf20,
                                        sf32, sf40, sf64, sf80, sf128,
                                        sf160, sf256, sf320, sf512,
                                        sf640},
            drxShortCycleTimer      INTEGER (1..16)
        }  OPTIONAL                                    -- Need OR
    }
}
```

In an example, the MAC entity may be configured by RRC with a discontinuous reception (DRX) functionality that controls the UE's downlink control channel (e.g., PDCCH) monitoring activity for a plurality of RNTIs for the MAC entity, e.g., C-RNTI and/or TPC-PUCCH-RNTI and/or TPC-PUSCH-RNTI and/or Semi-Persistent Scheduling C-RNTI (if configured) and/or eIMTA-RNTI (if configured) and/or SL-RNTI (if configured) and/or SL-V-RNTI (if configured) and/or CC-RNTI (if configured) and/or and SRS-TPC-RNTI (if configured). In an example, in response to being in RRC_CONNECTED, if DRX is configured, the MAC entity may monitor the PDCCH discontinuously using the DRX operation; otherwise the MAC entity may monitor the PDCCH continuously. RRC may control DRX operation by configuring a plurality of timers, e.g., onDurationTimer and/or drx-InactivityTimer and/or drx-RetransmissionTimer (e.g., one per DL HARQ process except for the broadcast process) and/or drx-ULRetransmissionTimer (one per asynchronous UL HARQ process) and/or the longDRX-Cycle and/or the value of the drxStartOffset and/or optionally the drxShortCycleTimer and/or shortDRX-Cycle. In an example, a HARQ RTT timer per DL HARQ process (except for the broadcast process) and/or UL HARQ RTT Timer per asynchronous UL HARQ process may be defined.

In an example, in response to a DRX cycle being configured, the Active Time may include includes the time while onDurationTimer or drx-InactivityTimer or drx-RetransmissionTimer or drx-ULRetransmissionTimer or mac-ContentionResolutionTimer is running.

In an example, drx-Inactivity-Timer may specify a time duration for which the UE may be Active after successfully decoding a PDCCH indicating a new transmission (UL or DL or SL). In an example, this timer may be restarted upon receiving PDCCH for a new transmission (UL or DL or SL). In an example, the UE may transition to a DRX mode in response to the expiry of this timer.

In an example, shortDRX-Cycle may be a first type of DRX cycle (e.g., if configured) that needs to be followed when UE enters DRX mode. In an example, this IE indicates the length of the short cycle.

In an example, drxShortCycleTimer may be expressed as multiples of shortDRX-Cycle. The timer may indicate the number of initial DRX cycles to follow the short DRX cycle before entering the long DRX cycle.

In an example, longDRX-CycleStartOffset may define long DRX cycle length and/or the DRX offset. DRX offset may be used to calculate the start of DRX cycle.

In an example, onDurationTimer may specify the time duration at the beginning of a DRX Cycle (e.g., DRX ON). In an example, onDurationTimer may indicate the time duration before entering the power saving mode (DRX OFF).

In an example, HARQ RTT Timer may specify a minimum duration from the time new transmission is received and before the UE may expect a retransmission of a same packet. In an example, this timer may be fixed and may not be configured by RRC.

In an example, drx-RetransmissionTimer may indicate a maximum duration for which UE may be monitoring PDCCH when a retransmission from the eNodeB is expected by the UE.

In an example, in response to a DRX cycle being configured, the Active Time may include includes the time while a Scheduling Request is sent on PUCCH and is pending.

In an example, in response to a DRX cycle being configured, the Active Time may include includes the time while an uplink grant for a pending HARQ retransmission can occur and there is data in the corresponding HARQ buffer for synchronous HARQ process.

In an example, in response to a DRX cycle being configured, the Active Time may include includes the time while a PDCCH indicating a new transmission addressed to the C-RNTI of the MAC entity has not been received after successful reception of a Random Access Response for the preamble not selected by the MAC entity.

In an example, DRX may be configured for a wireless device. The HARQ RTT Timer may expire in a subframe and the data of the corresponding HARQ process may not be successfully decoded. The MAC entity may start the drx-RetransmissionTimer for the corresponding HARQ process.

In an example, DRX may be configured for a wireless device. An UL HARQ RTT Timer may expire in a subframe. The MAC entity may start the drx-ULRetransmissionTimer for the corresponding HARQ process.

In an example, DRX may be configured for a wireless device. A DRX Command MAC control element or a Long DRX Command MAC control element may be received. The MAC entity may stop onDurationTimer and stop drx-InactivityTimer.

In an example, DRX may be configured for a wireless device. In an example, drx-InactivityTimer may expire or a DRX Command MAC control element may be received in a subframe. In an example, in response to Short DRX cycle being configured, the MAC entity may start or restart drxShortCycleTimer and may use Short DRX Cycle. Otherwise, the MAC entity may use the Long DRX cycle.

In an example, DRX may be configured for a wireless device. In an example, drxShortCycleTimer may expire in a subframe. The MAC entity may use the Long DRX cycle.

In an example, DRX may be configured for a wireless device. In an example, a Long DRX Command MAC control element may be received. The MAC entity may stop drxShortCycleTimer and may use the Long DRX cycle.

In an example, DRX may be configured for a wireless device. In an example, if the Short DRX Cycle is used and [(SFN*10)+subframe number] modulo (shortDRX-Cycle)= (drxStartOffset) modulo (shortDRX-Cycle).

In an example, DRX may be configured for a wireless device. In an example, if the Long DRX Cycle is used and [(SFN*10)+subframe number] modulo (longDRX-Cycle)= drxStartOffset. The wireless device may start onDurationTimer.

In an example, DRX may be configured for a wireless device. In an example, during the Active Time, for a PDCCH-subframe, the subframe may not be required for uplink transmission for half-duplex FDD UE operation. In an example, the subframe may not be a half-duplex guard subframe. In an example, the subframe may not be part of a configured measurement gap. In an example, the subframe may not be part of a configured Sidelink Discovery Gap for Reception. In an example, DRX may be configured for a wireless device. In an example, during the Active Time, for a subframe other than a PDCCH-subframe and for a UE capable of simultaneous reception and transmission in the aggregated cells, the subframe may be a downlink subframe indicated by a valid eIMTA L1 signalling for at least one serving cell not configured with schedulingCellId. In an example, the subframe may not be part of a configured measurement gap. In an example, the subframe may not be part of a configured Sidelink Discovery Gap for Reception. In an example, DRX may be configured for a wireless device. In an example, during the Active Time, for a subframe other than a PDCCH-subframe and for a UE not capable of simultaneous reception and transmission in the aggregated cells, the subframe may be a downlink subframe indicated by a valid eIMTA L1 signalling for the SpCell. In an example, the subframe may not be part of a configured measurement gap. In an example, the subframe may not be part of a configured Sidelink Discovery Gap for Reception. The wireless device may monitor the PDCCH. In an example, if the PDCCH indicates a DL transmission or if a DL assignment has been configured for this subframe, the wireless device may start the HARQ RTT Timer for the corresponding HARQ process. The wireless device may stop the drx-RetransmissionTimer for the corresponding HARQ process. In an example, if the PDCCH indicates an UL transmission for an asynchronous HARQ process or if an UL grant has been configured for an asynchronous HARQ process for this subframe, the wireless device may start the UL HARQ RTT Timer for the corresponding HARQ process in the subframe containing the last repetition of the corresponding PUSCH transmission. The wireless device may stop the drx-ULRetransmissionTimer for the corresponding HARQ process. In an example, if the PDCCH indicates a new transmission (DL, UL or SL), the wireless device may start or restart drx-InactivityTimer.

In an example embodiment, one or more of the DRX timers (e.g., HARQ RTT timer and/or uplink HARQ RTT timer) may have dynamic values. In an example, a value of a DRX timer may be indicated dynamically, e.g., based on one or more indication in DCI and/or in in combination of DCI and RRC (e.g., RRC may configure a plurality of values and DCI may indicate one or more of the plurality of values, e.g., by indicating an index).

Figure 15:
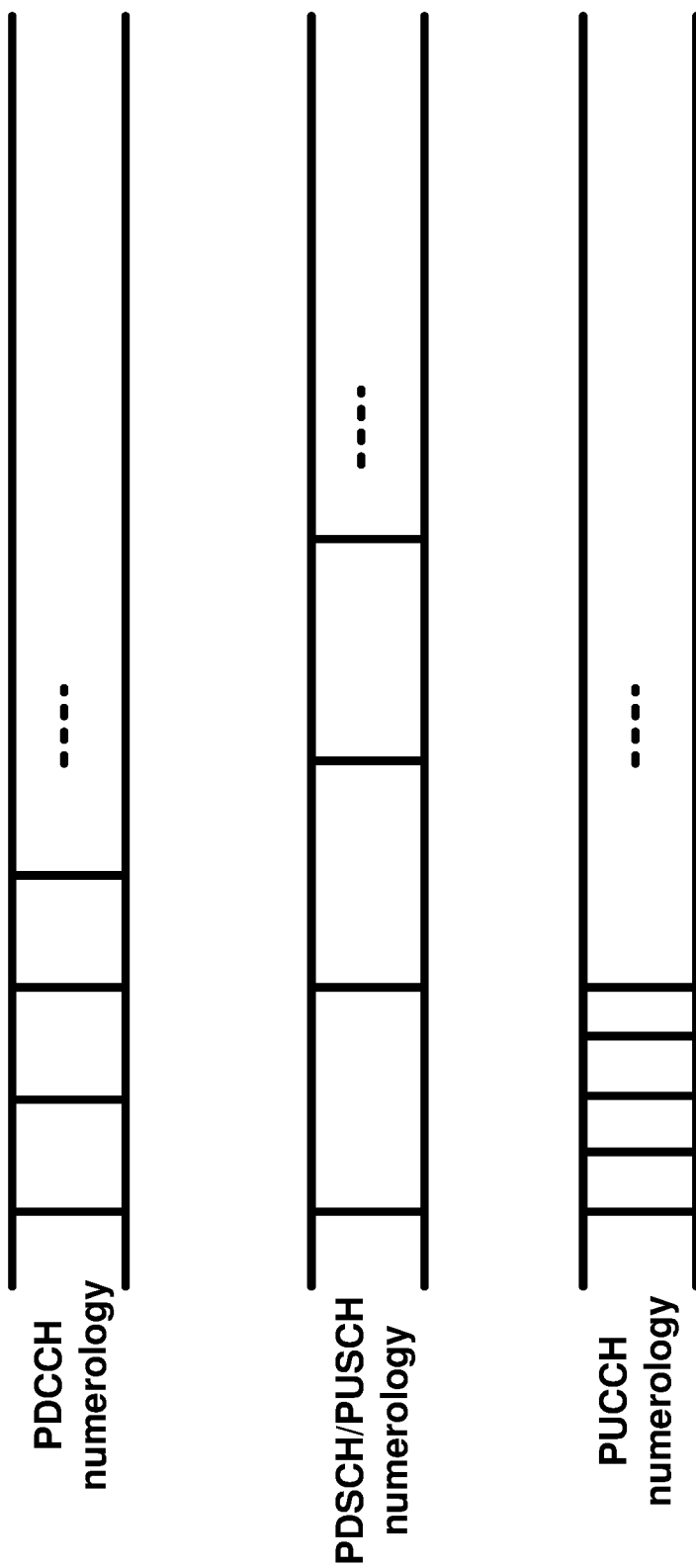
FIG. 15 is an example diagram depicting various numerologies of various physical channels as per an aspect of an embodiment of the present invention.
Figure 16:
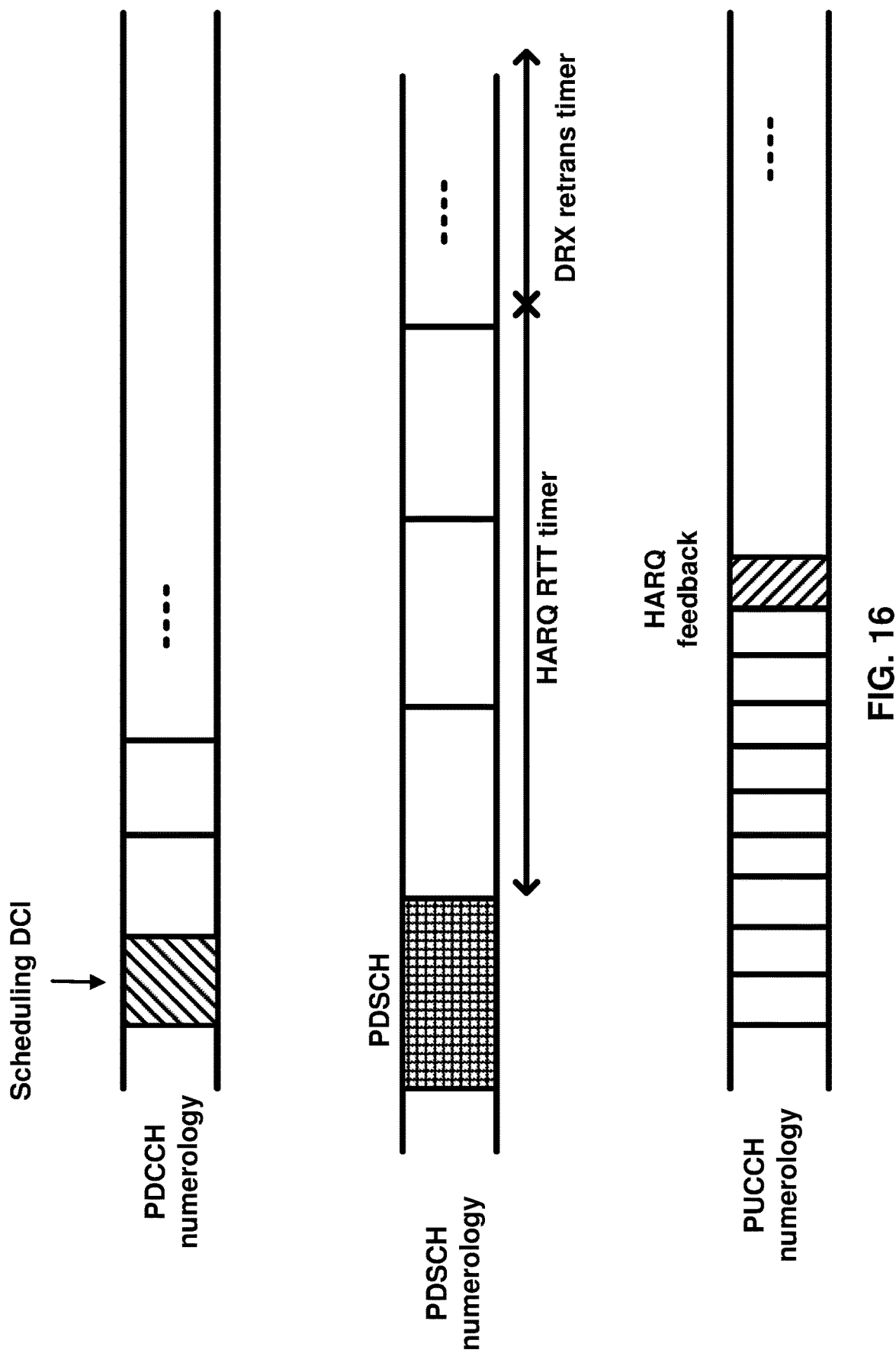
FIG. 16 is an example diagram depicting various numerologies of various physical channels as per an aspect of an embodiment of the present invention.

In an example, the DCI indicating a scheduled transmission (e.g., for uplink and/or downlink and/or sidelink communication) may be received on a PDCCH with first numerology. The scheduled transmission may be for a second numerology. In an example, the scheduled transmission and/or the numerology of the scheduled transmission may be indicated in the DCI. In an example, the scheduled transmission (e.g., PDSCH) may correspond to a PUCCH. For example, a HARQ feedback associated with a PDSCH may be transmitted on the PUCCH corresponding to the PDSCH. In an example, the PUCCH may be transmitted on a third numerology. In an example, the first and/or the second and/or the third numerologies may be different. An example is shown in FIG. 15. The legacy DRX timer operation may be based on the number of PDCCH subframes (e.g., PSF), e.g., a time granularity of DRX timers may be based on the PDCCH subframe. Due to a plurality of numerologies/TTIs configured for the wireless device, the legacy behavior of the DRX timers may lead to inefficient DRX operation. An example is shown in FIG. 16. The wireless device may wrongly interpret a DRX off cycle as DRX on leading to degrading wireless device and base station performance. There is a need to enhance the legacy DRX timers operation to take numerologies/TTIs of various physical channels into consideration for determining a duration of a timer and/or a timer granularity for the timer.

In an example, long duration NR-PUCCH for up to 2 bits in a given slot may comprise HARQ ACK feedback, two-states SR e.g., based on on-off keying, time domain OCC. In an example, HARQ ACK feedback may be transmitted by BPSK or QPSK modulation and may be repeated in time domain and multiplied with sequence(s).

In an example, NR may support one long PUCCH format for UCI with up to 2 bits with high multiplexing capacity. In an example, NR may support one long PUCCH format for UCI with large payload with no multiplexing capacity. In an example, NR may support one long PUCCH format for UCI with moderate payload with some multiplexing capacity.

In an example, at least a first PUCCH with a short duration and/or a second PUCCH with a long duration may be configured for a wireless device. The first PUCCH and the second PUCCH may be transmitted on different numerologies/TTIIs. In an example, the short PUCCH may employ a numerology with a shorter TTI than the long PUCCH. In an example, there may be a mapping between a type of uplink control information (UCI) and the type of PUCCH (e.g., short PUCCH or long PUCCH) that carriers the UCI. In an example, periodic CSI may be reported at least on short PUCCH or long PUCCH. In an example, the periodic CSI may be reported in a single slot. In an example, the periodic CSI may be reported us single slot and/or multiple slots. In an example, type I CSI feedback may be reported for P/SP/A-CSI. In an example, type I CSI feedback may be carrier on either PUCCH or PUSCH. In an example, type I CSI feedback may be carrier on either one of PUSCH or long PUCCH. In an example, type II CSI feedback may be carrier at least on PUSCH.

In an example, for a long PUCCH with up to 2 bits UCI, DMRS may occur in every symbol in long PUCCH. In an example, for a long PUCCH with up to 2 bits UCI, DMRS may occur in even and/or odd symbols in long PUCCH. In an example, for a PUCCH format for UCI with large payload and/or with no multiplexing capacity within a slot: the DMRS and UCI may be mapped to different symbols. In an example, for intra-slot frequency-hopping, one or two DMRS symbol(s) may be mapped on each frequency-hop of the long-PUCCH. In an example, there may be one DMRS per frequency-hop. The location may be around the middle of the frequency-hop. In an example, there may be one or two DMRS per frequency-hop.

In an example, a logical channel prioritization procedure in a MAC layer of a wireless device may take into account a plurality of information/parameters indicated by an uplink grant DCI for its multiplexing functionalities and creating transport blocks. In an example, at least part of the information/parameters indicated by the DCI/profile may be visible to the MAC layer and/or logical channel prioritization procedure. The plurality of information may be indicated to the wireless device explicitly or implicitly. In an example, RRC may configure the wireless device with a plurality of profiles and the uplink grant DCI may indicate an index to a profile in the plurality of profiles. In an example, the uplink grant DCI may comprise a field indicating the index. The profile may comprise a plurality of parameters comprising a numerology (e.g., numerology to be employed for transmission of PUSCH) and/or TTI (e.g., TTI to be employed for transmission of PUSCH) and/or a QoS profile for example indicating a service type associated with the grant/PUSCH and/or logical channels associated with the grant/PUSCH and/or power-related parameters (e.g., power headroom reporting, etc.) and/or one or more restrictions that the wireless device may consider when multiplexing data (e.g., MAC SDUs and/or MAC CEs) in at least one TB associated with the grant/PUSCH.

In an example, a DCI scheduling a transmission in downlink, uplink, etc., may indicate numerology/TTI corresponding to the scheduled transmission. In an example, a DCI indicating a downlink assignment may indicate a cell/numerology/TTI corresponding to the scheduled downlink assignment. In an example, the numerology/TTI may be implicitly indicated. For example, the wireless device may implicitly determine a numerology/TTI corresponding to a scheduled transmission from the numerology/TTI on which the DCI is received. In an example, the numerology/TTI may be implicitly indicated by the DCI by indicating a profile/index. The wireless device may be configured with a plurality of profiles and the index indicated by the DCI may determine the profile. In an example, the profile may comprise a plurality of parameters comprising the numerology/TTI. In an example, the DCI may comprise a field, the value of the field indicating the profile (e.g., using an index). In an example, the numerology/TTI of the scheduled transmission may be explicitly indicated, e.g., in the scheduling DCI. In an example, the scheduling DCI may comprise a field indicating the numerology/TTI of the scheduled transmission.

In an example, the DCI scheduling a transmission may indicate a timing between the DCI and the scheduled transmission (e.g., timing between DCI and PUSCH or timing between DCI and PDSCH, etc.). In an example, the timing may be explicitly indicated in the DCI. In an example, the timing may be indicated as a number (e.g., integer). In an example, the scheduling DCI may comprise a field, the value of the field may indicate the timing. In an example, the timing may be implicitly indicated to the wireless device by the DCI. In an example, the base station may configure the wireless device with a plurality of timing values and the DCI may indicate one of the plurality of the configured timing values. In an example, the wireless device may use the value of timing indicated in the DCI along with a timing granularity to determine the time between the DCI and the scheduled transmission. The timing granularity may be based on a rule. In an example, the timing granularity between a DCI and a scheduled PUSCH may be based on a numerology of the PUSCH (e.g., in terms of OFSM symbols, TTI, slot, etc.). In an example, the timing granularity between DCI and the PDSCH may be based on the numerology of the PDSCH. In an example, in case of self-carrier scheduling PDSCH, the PDCCH and the PDSCH may have a same numerology. The wireless device may implicitly determine that the time granularity between DCI and the PDSCH is based on the numerology of the PDCCH/DCI.

In an example embodiment, the wireless device may transmit HARQ feedback associated with a PDSCH on a PUCCH and/or multiplex the HARQ feedback associate with a PDSCH on a PUSCH. The timing between the PDSCH and the HARQ feedback may be indicated in the DCI. In an example, the timing may be explicitly indicated to the wireless device. In an example, the timing may be implicitly indicated to the wireless device. The base station may configure (e.g., with RRC) a plurality of timing values and the DCI may indicate a timing value among the plurality of timing values. In an example, the DCI may comprise a field indicating the timing between scheduled PDSCH and the HARQ feedback associated with the scheduled PDSCH. In an example, a DCI format may not comprise a HARQ feedback timing field. The wireless device may not transmit HARQ feedback for scheduled downlink transmission associated with the DCI. The wireless device may determine the time between PDSCH and HARQ feedback based on the timing indicated by the DCI and a timing granularity. In an example, the wireless device may determine the timing granularity between PDSCH and HARQ feedback based on numerology of a PUCCH associated with the PDSCH.

In an example, a wireless device may be configured with a plurality of cell groups. In an example, a cell group in the plurality of cell groups may be associated with one or more PUCCHs, e.g., one or more carriers transmitting PUCCH. In an example, the one or more PUCCHs within a cell group may have a same numerology/TTI. In an example, at least two of the one or more PUCCHs within a cell group may have different numerologies/TTIs. In an example, a PDSCH and/or TTI/numerology associated with a PDSCH transmitted on a cell in a cell group may be associated with a PUCCH in the cell group e.g., based on the numerology/TTI associated with the PDSCH, the TB(s) content/size/service type associated with the PDSCH, etc. The wireless device may determine timing between the PDSCH and HARQ feedback for the PDSCH based on a numerology corresponding to the PUCCH associated with PDSCH.

In an example embodiment, a wireless device may receive one or more messages comprising configuration parameters for one or more cells. In an example, the one or more message may comprise RRC messages. The wireless device may receive a first downlink control information (DCI) over a first downlink control channel (e.g., PDCCH/EPDCCH and/or alike). The DCI may indicate a downlink assignment. The DCI may indicate parameters for a physical downlink shared channel (PDSCH) transmission of at least one transport block. In an example, the DCI may indicate transmission of the PDSCH in a same cell that the DCI is received (e.g., self-carrier scheduling). In an example, the DCI may be received and/or may indicate transmission of the PDSCH in a different cell than the cell that the DCI is received (e.g., cross-carrier scheduling). In an example, the DCI/downlink assignment may indicate a first numerology/TTI that the PDSCH/the at least one transport block is transmitted. The at least one transport block may correspond to a first hybrid automatic repeat request (HARQ) process. In an example, the HARQ process identifier corresponding to the at least one transport block may be indicated in the DCI/downlink assignment. In an example, the PDSCH may correspond to a PUCCH with a second numerology/TTI. In an example, the correspondence between the PDSCH and the PUCCH (e.g., correspondence between the first numerology and the second numerology) may be indicated in the one or more messages. In an example, the correspondence between the PDSCH and the PUCCH may be indicated in the DCI. In an example, the correspondence between the PDSCH and the PUCCH may be based on a pre-configured rule. In an example, the correspondence between the PDSCH and the PUCCH may be based on the first numerology/TTI associated with the PDSCH and/or service type of data transmitted by the PDSCH and/or the content of data/transport block(s) in the PDSCH (e.g., logical channels multiplexed in the transport block(s) carried by the PDSCH) and/or the size of transport block(s) carried by the PDSCH, and/or other parameters/rules. In an example, the wireless device may start a HARQ round trip time (RTT) timer for the HARQ process (e.g., HARQ process corresponding to the at least one transport block transmitted by the PDSCH). In an example, the wireless device may start the HARQ RTT timer in response to receiving the PDSCH. In an example, the wireless device may start the HARQ RTT timer in response to receiving the downlink assignment DCI. In an example, PDSCH may be received in a same subframe/slot/timing as the downlink assignment DCI. In an example, PDSCH may be received in a different subframe/slot/timing than the downlink assignment DCI.

In an example embodiment, a HAQR feedback timing may be indicated by the DCI. In an example, the HARQ feedback timing may be indicated as a first integer in the DCI. To determine the HARQ feedback timing duration, the wireless device may multiply the first integer by a time granularity. In an example, the one or more messages (e.g., RRC configuration parameters) may comprise a plurality of values/numbers for the HARQ feedback timing determination and the HARQ feedback timing indicated by the DCI may provide an index to one of the plurality of HAQR ACK timing values indicated by the RRC.

In an example, one or more wireless device timers control control-channel monitoring and HARQ retransmission. There is a need to enhance control control-channel monitoring and HARQ retransmission mechanisms for new radio technology. For example, the new radio technology is designed for a plurality of symbol and slot durations that are implemented for different types of services. For example, retransmission requirements for new radio technology requires different timing requirements for different services. Implementation of legacy operation of control-channel timers and re-transmission procedures may increase battery power consumption and reduce uplink efficiency. There is a need for implementation of enhanced control-channel monitoring and HARQ retransmission for new radio technology. Example embodiments enhance control-channel monitoring and HARQ retransmission in a wireless device and base station.

Figure 17:
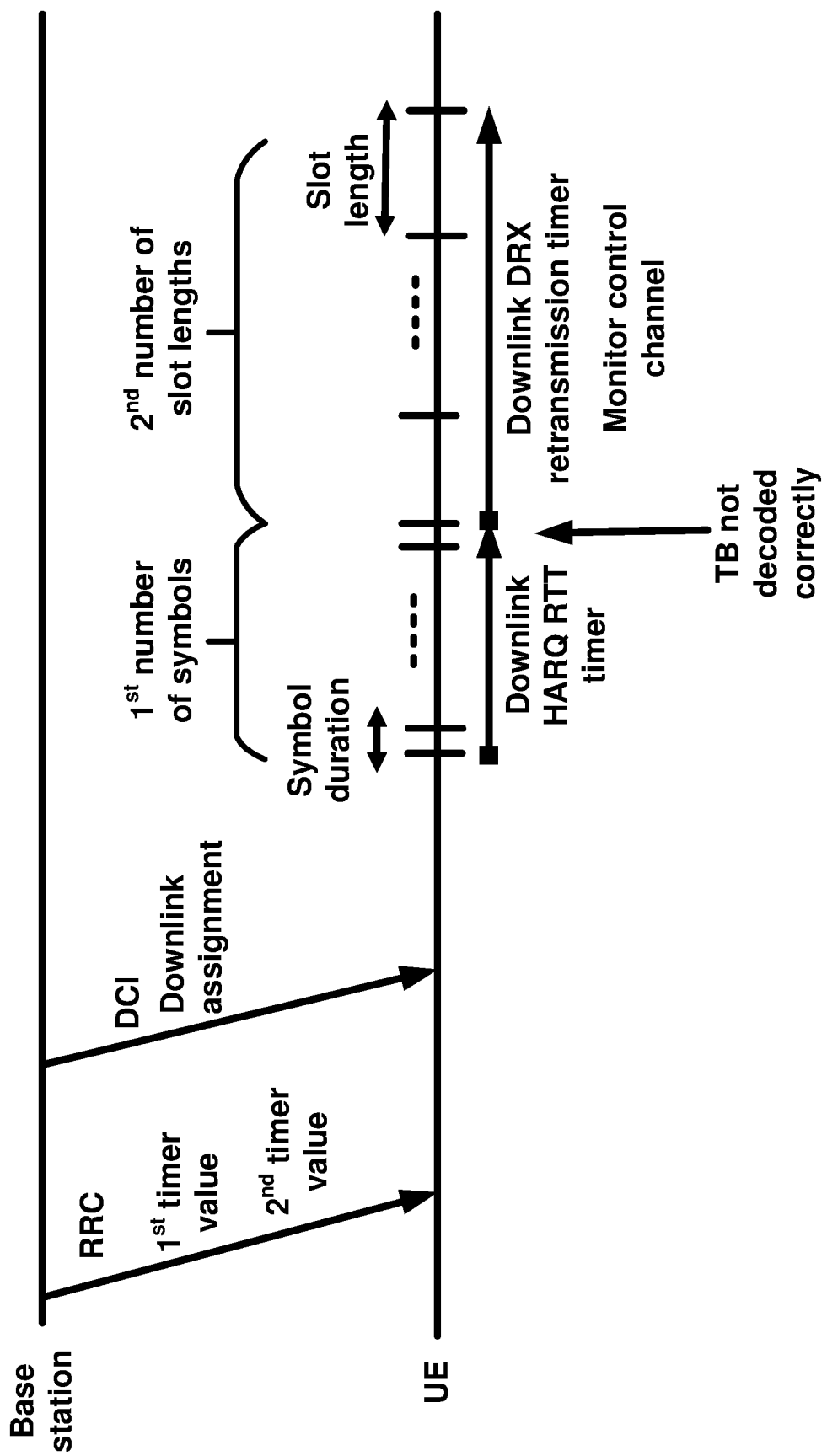
FIG. 17 is an example discontinuous reception process as per an aspect of an embodiment of the present disclosure.

In an example embodiment and as shown in FIG. 17, a wireless device may receive one or more messages may comprising: a first value for a downlink hybrid automatic repeat request (HARQ) round-trip-time (RTT) timer and a second value for a downlink discontinuous reception (DRX) retransmission timer. The first value indicates a first number of symbols and the second value indicates a second number of slot lengths. In an example, the symbols may correspond to a downlink channel. In an example, the symbols may correspond to an uplink channel. In an example, the slots may correspond to a downlink channel. In an example, the slots may correspond to an uplink channel. In example embodiments enhance configuration of HARQ RTT timer and DRX retransmission timer. This procedure enhances HARQ retransmission in a wireless device and base station by allowing a base station to configure different values for HARQ RTT timers for different wireless devices based on HARQ requirements. This may increase downlink singling overhead, but instead improves control channel monitoring and HARQ retransmission. This procedure improves overall air interface spectral efficiency and power consumption. To reduce downlink signaling information element sizes and provide additional flexibility, in example embodiments HARQ RTT timers are configured in terms of symbols, and DRX retransmission timers are configured in terms of slot durations instead of using time units in terms of miliseconds. DRX retransmission timers are typically longer and therefore configuration via slot units may require lower number overhead bits and reduce downlink signaling information element sizes.

The wireless device may receive a downlink control information indicating downlink transmission (e.g., via PDSCH) of a transport block. The downlink control information may indicate resource allocation parameters, HARQ related parameters (e.g., HARQ process ID, NDI, RV, etc.). In an example, the one or more messages may comprise a a third value in a third plurality of values indicating a time duration between a first transmission time of the transport block and a second transmission time of HARQ feedback corresponding to the transport block. In an example, the downlink control information may indicate an index to the third value in the third plurality of values. In an example, the transport block may be received via the downlink channel in a first slot. In an example, the HARQ feedback may transmitted in a second slot. The time duration between the first slot and the second slot may be based on the third value. In an example, the third value may be an integer. The wireless device may start the downlink HARQ RTT timer with the first value in response to receiving the downlink control information, wherein the first value indicates a first number of symbols. In an example, the symbols may correspond to a downlink channel. In an example, the downlink channel may be PDSCH. In an example, the symbols may correspond to an uplink channel. In an example, the uplink channel may be an uplink control channel (e.g., PUCCH). In an example, the HARQ feedback corresponding to the transport block may be transmitted via the uplink control channel. The wireless device may start the downlink DRX retransmission timer with the second value in response to the downlink HARQ RTT timer expiring and the transport block not being successfully decoded, wherein the second value indicates a second number of slot lengths. In an example, the slot lengths may correspond to a downlink channel. In an example, the downlink channel may be PDSCH. In an example, the slot lengths may correspond to an uplink channel. In an example, the uplink channel may be an uplink control channel (e.g., PUCCH). In an example, the HARQ feedback corresponding to the transport block may be transmitted via the uplink control channel. The wireless device may monitor a downlink control channel while the downlink DRX retransmission timer is running.

Figure 18:
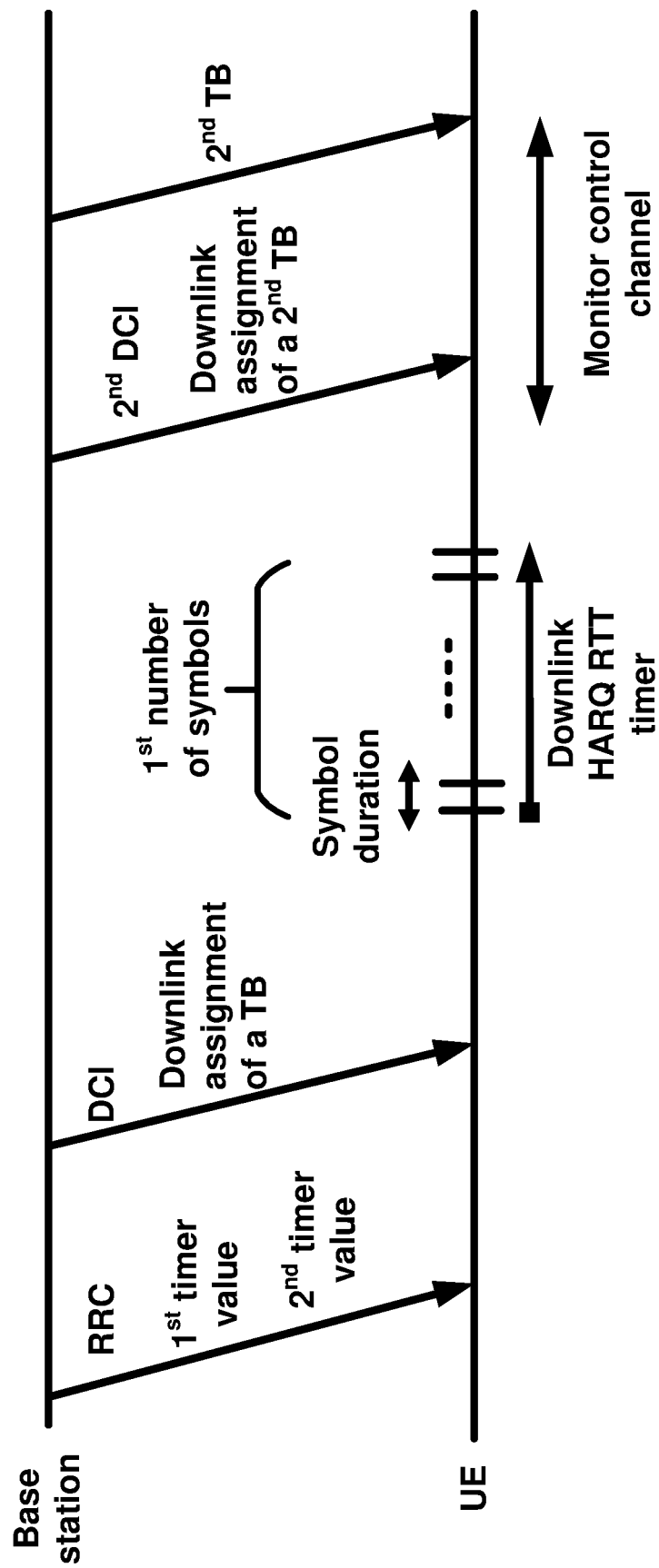
FIG. 18 is an example control channel monitoring as per an aspect of an embodiment of the present disclosure.

In an example embodiment and as shown in FIG. 18, a wireless device may receive one or more messages comprising a first value for a downlink hybrid automatic repeat request (HARQ) round-trip-time (RTT) timer. The first value indicates a first number of symbols. In an example, the symbols may correspond to first symbols of a downlink channel. In an example, the downlink channel may PDSCH. In an example, the symbols may correspond to second symbols of an uplink channel. In an example, the uplink channel may be PUCCH. This procedure enhances HARQ retransmission in a wireless device and base station by allowing a base station to configure different values for HARQ RTT timers for different wireless devices based on HARQ requirements. To provide additional flexibility, in example embodiments HARQ RTT timers are configured in terms of symbols instead of mili-seconds. This may increase downlink singling overhead, but instead improves control channel monitoring and HARQ retransmission. This procedure improves overall air interface spectral efficiency and power consumption.

The wireless device may start the downlink HARQ RTT timer with the first value in response to receiving the downlink control information, wherein the first value indicates a first number of symbols. In response to the downlink HARQ RTT timer expiring, start monitoring a downlink control channel for a second downlink control information. The wireless device may receive a second transport block in response to receiving the second downlink control information. In an example, the symbols may correspond to first symbols of a downlink channel. In an example, the downlink channel may PDSCH. Ina ne example, the symbols may correspond to second symbols of an uplink channel. In an example, the uplink channel may be PUCCH. In an example, the HARQ feedback corresponding to the transport block may be transmitted via the uplink channel. In an example, the one or more messages may comprise a third value in a third plurality of values indicating a time duration between a first transmission time of the transport block and a second transmission time of HARQ feedback corresponding to the transport block. In an example, the downlink control information may indicate an index to the third value in the third plurality of values. In an example, the transport block may be received via the downlink channel in a first slot. In an example, the HARQ feedback may transmitted in a second slot. The time duration between the first slot and the second slot may be based on the third value. In an example, the third value may be an integer.

In an example embodiment, a time duration from a start of the HARQ RTT timer until expiration of HARQ RTT timer may be based on the first numerology/TTI (e.g., numerology/TTI corresponding to the PDSCH). In an example, the time granularity for the HARQ RTT timer may be OFDM symbol corresponding to the first numerology. In an example, the time granularity of the HARQ RTT timer may be slot duration corresponding to the first numerology. In an example, the time duration corresponding to the HARQ RTT timer may be TTI duration corresponding to the first numerology. In an example, the time duration from starting of the HARQ RTT timer until its expiration may be (the number indicated in the DCI (e.g., explicitly in DCI or DCI indicating a RRC configured value) plus a first value wherein the first value may be pre-configured/configured) multiplied by (the time granularity for HARQ RTT timer).

In an example embodiment, a time duration from a start of the HARQ RTT timer until expiration of HARQ RTT timer may be based on the second numerology/TTI (e.g., numerology/TTI corresponding to the PUCCH). In an example, the time granularity for the HARQ RTT timer may be OFDM symbol corresponding to the second numerology. In an example, the time granularity of the HARQ RTT timer may be slot duration corresponding to the second numerology. In an example, the time duration corresponding to the HARQ RTT timer may be TTI duration corresponding to the second numerology. In an example, the time duration from starting of the HARQ RTT timer until its expiration may be (the number indicated in the DCI (e.g., explicitly in DCI or DCI indicating a RRC configured value) plus a first value wherein the first value may be pre-configured/configured) multiplied by (the time granularity for HARQ RTT timer).

In an example embodiment, a HAQR RTT timer may be based on a field in the DCI. In an example, the HARQ RTT timer may be indicated as a plurality of integers (e.g., a tuple). In an example, the HARQ RTT timer may be indicates as a 2-tuple (e.g., (n1, n2)). To determine the HARQ RTT timer duration, the wireless device may multiply the first integer in the tuple by a first timing granularity, second integer in the tuple by a second timing granularity, etc. In an example, the one or more messages (e.g., RRC configuration parameters) may comprise a plurality of values/tuples for the HARQ RTT timer determination and the HARQ feedback timing/HARQ RTT timer indicated in the DCI may provide an index to one of the plurality of HAQR feedback timing/HAR RTT timer values/tuples indicated by the RRC.

In an example embodiment, a time duration from a start of the HARQ RTT timer until expiration of HARQ RTT timer may be based on both the second numerology/TTI (e.g., numerology/TTI corresponding to the PUCCH) and the first numerology (e.g., numerology/TTI corresponding to the PDSCH). In an example, a first time granularity for the HARQ feedback timing may be OFDM symbol corresponding to the second numerology (e.g., numerology corresponding to PUCCH) and a second time granularity for HARQ timing may be the OFDM symbol corresponding to the first numerology (e.g., numerology corresponding to PDSCH). In an example, the first time granularity of the HARQ feedback timing may be slot duration corresponding to the second numerology (e.g., numerology corresponding to PUCCH) and the second time granularity for HARQ feedback timing determination may be slot duration corresponding to the first numerology (e.g., numerology corresponding to PDSCH). In an example, the first time granularity of HARQ feedback timing may be TTI duration corresponding to the second numerology (e.g., numerology corresponding to PUCCH) and the second time granularity of HARQ feedback timing may be TTI duration corresponding to the first numerology (e.g., numerology corresponding to PDSCH). In an example, the time duration from starting of the HARQ RTT timer until its expiration may be the first number (e.g., of tuple) indicated in the DCI (e.g., explicitly in DCI or DCI indicating a RRC configured value) multiplied by the first time granularity for HARQ feedback timing plus the second number indicated in the tuple multiplied by the second time granularity. In an example, the second number may not be indicated in the DCI. In an example, the second number known and/or may be pre-configured.

In an example embodiment, a time duration from a start of the HARQ RTT timer until expiration of HARQ RTT timer may be based on the second numerology/TTI (e.g., numerology/TTI corresponding to the PUCCH) and a third numerology (e.g., a pre-configured/default numerology/TTI and/or numerology/TTI indicated in the DCI and/or numerology/TTI indicated by the RRC). In an example, a first time granularity for the HARQ ACK timing may be OFDM symbol corresponding to the second numerology (e.g., numerology corresponding to PUCCH) and a second time granularity for HARQ timing may be the OFDM symbol corresponding to the third numerology. In an example, the first time granularity of the HARQ feedback timing may be slot duration corresponding to the second numerology (e.g., numerology corresponding to PUCCH) and the second time granularity for HARQ feedback timing determination may be slot duration corresponding to the third numerology. In an example, the first time granularity of HARQ feedback timing may be TTI duration corresponding to the second numerology (e.g., numerology corresponding to PUCCH) and the second time granularity of HARQ feedback timing may be TTI duration corresponding to the third numerology. In an example, the time duration from starting of the HARQ RTT timer until its expiration may be the first number (e.g., of tuple) indicated in the DCI (e.g., explicitly in DCI or DCI indicating a RRC configured value) multiplied by the first time granularity for HARQ feedback timing plus the second number indicated in the tuple multiplied by the second time granularity. In an example, the second number may not be indicated in the DCI. In an example, the second number known and/or may be pre-configured.

In an example embodiment, DCI (e.g., downlink assignment DCI corresponding to PDSCH) may indicate numerology and/or numerologies (e.g., first numerology and/or second numerology and/or both second and first numerology and/or both second a third numerology) for HARQ RTT timer duration determination. In an example, RRC configuration may comprise a plurality of numerologies and/or numerology tuples and DCI may indicate (e.g., using an index) a numerology and/or numerology tuple among the plurality of numerologies/numerology tuples for HARQ feedback timing determination.

In an example, the wireless device may receive a second DCI in response to the HARQ RTT timer expiring. The second DCI may indicate the retransmission of at least one of the at least one TB and/or transmission of a new at least one transport block. The wireless device may retransmit the at least one of the at least one TB and/or generate the new at least one TB and transmit the new at least one TB.

In an example embodiment, a wireless device may employ a method comprising receiving a DCI indicating parameters for a PDSCH transmission of at least one transport block. In an example, the PDSCH may have a first numerology. In an example, the at least one TB may correspond to a first HARQ process. In an example, the PDSCH may correspond to a PUCCH. In an example, the PUCCH may have a second numerology. The wireless device may start a HARQ RTT timer for the HARQ process in response to receiving the PDSCH. In an example embodiment, the time granularity of the HARQ RTT timer may be based on the second granularity. In an example, the wireless device may receive a second DCI in response to the HARQ RTT timer expiring.

In an example embodiment, a wireless device may employ a method comprising receiving a DCI indicating parameters for a PDSCH transmission of at least one transport block. In an example, the PDSCH may have a first numerology. In an example, the at least one TB may correspond to a first HARQ process. In an example, the PDSCH may correspond to a PUCCH. In an example, the PUCCH may have a second numerology. The wireless device may start a HARQ RTT timer for the HARQ process in response to receiving the PDSCH. In an example embodiment, the time granularity of the HARQ RTT timer may be based on the first granularity. In an example, the wireless device may receive a second DCI in response to the HARQ RTT timer expiring.

In an example embodiment, a wireless device may employ a method comprising receiving a DCI indicating parameters for a PDSCH transmission of at least one transport block. In an example, the PDSCH may have a first numerology. In an example, the at least one TB may correspond to a first HARQ process. In an example, the PDSCH may correspond to a PUCCH. In an example, the PUCCH may have a second numerology. The wireless device may start a HARQ RTT timer for the HARQ process in response to receiving the PDSCH. In an example embodiment, the time granularity of the HARQ RTT timer may be based on both the first numerology and the second granularity. In an example, the time granularity for a time between PDSCH and the HARQ feedback may be based on the second numerology and the time granularity after transmission of the HARQ feedback may be based on the first numerology. In an example, the wireless device may receive a second DCI in response to the HARQ RTT timer expiring.

In an example embodiment, a wireless device may employ a method comprising receiving a DCI indicating parameters for a PDSCH transmission of at least one transport block. In an example, the PDSCH may have a first numerology. In an example, the at least one TB may correspond to a first HARQ process. In an example, the PDSCH may correspond to a PUCCH. In an example, the PUCCH may have a second numerology. The wireless device may start a HARQ RTT timer for the HARQ process in response to receiving the PDSCH. In an example embodiment, the time granularity of the HARQ RTT timer may be based on the second granularity and a third numerology. In an example, the time granularity for a time between PDSCH and the HARQ feedback may be based on the second numerology and the time granularity after transmission of the HARQ feedback may be based on the third numerology. In an example, the third numerology may be a configured/pre-configured/default numerology and/or indicated by DCI/RRC. In an example, the wireless device may receive a second DCI in response to the HARQ RTT timer expiring.

In an example, one or more wireless device timers control control-channel monitoring and HARQ retransmission. There is a need to enhance control control-channel monitoring and HARQ retransmission mechanisms for new radio technology. For example, the new radio technology is designed for a plurality of symbol and slot durations that are implemented for different types of services. For example, retransmission requirements for new radio technology requires different timing requirements for different services. Implementation of legacy operation of control-channel timers and re-transmission procedures may increase battery power consumption and reduce uplink efficiency. There is a need for implementation of enhanced control-channel monitoring and HARQ retransmission for new radio technology. Example embodiments enhance control-channel monitoring and HARQ retransmission in a wireless device and base station.

Figure 19:
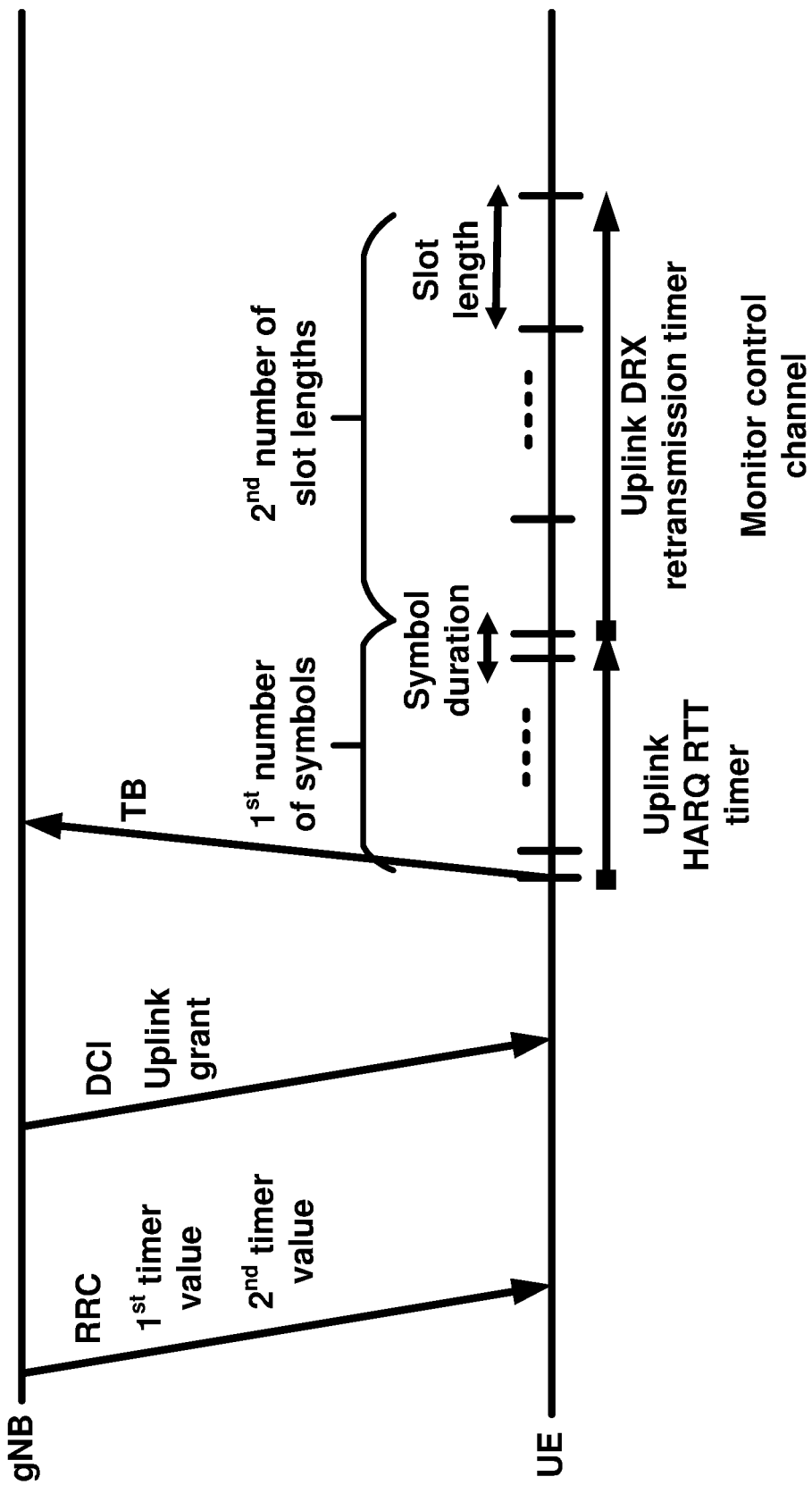
FIG. 19 is an example discontinuous reception process as per an aspect of an embodiment of the present disclosure.

In an example embodiment and as shown in FIG. 19, a wireless device may receive one or more messages comprising: a first value for an uplink hybrid automatic repeat request (HARQ) round-trip-time (RTT) timer and a second value for an uplink discontinuous reception (DRX) retransmission timer. The first value indicates a first number of symbols and the second value indicates a second number of slot lengths. In an example, the symbols may correspond to an uplink channel. In an example, the slots may correspond to an uplink channel. In example embodiments enhance configuration of HARQ RTT timer and DRX retransmission timer. This procedure enhances HARQ retransmission in a wireless device and base station by allowing a base station to configure different values for HARQ RTT timers for different wireless devices based on HARQ requirements. This may increase downlink singling overhead, but instead improves control channel monitoring and HARQ retransmission. This procedure improves overall air interface spectral efficiency and power consumption. To reduce downlink signaling information element sizes and provide additional flexibility, in example embodiments HARQ RTT timers are configured in terms of symbols, and DRX retransmission timers are configured in terms of slot durations instead of using time units in terms of mili-seconds. DRX retransmission timers are typically longer and therefore configuration via slot units may require lower number overhead bits and reduce downlink signaling information element sizes.

The wireless device may transmit a transport block via an uplink data channel. The wireless device may start the uplink HARQ RTT timer with the first value in response to transmitting the transport block, wherein the first value indicates a first number of symbols. In an example, the symbols correspond to first symbols of the uplink data channel. In an example, the slot lengths correspond to first slot lengths of the uplink data channel. The wireless device may start the uplink DRX retransmission timer with the second value in response to the uplink HARQ RTT timer expiring, wherein the second value indicates of a second number of slot lengths. The wireless device may monitor a downlink control channel while the uplink DRX retransmission timer is running. In an example, the wireless device may receive a downlink control information comprising transmission parameters of the transport block. In an example, the one or more messages may further comprise configuration parameters of a first cell and a second cell. The downlink control information may be received via the first cell. The transport block may be transmitted via the second cell. In an example, the one or more messages may further comprise configuration parameters of a first cell. The downlink control information may be received via the first cell. The transport block may be transmitted via the first cell. In an example, the downlink control information may indicate a HARQ process for the transport block. The uplink HARQ RTT timer and the uplink DRX retransmission timer may be associated with the HARQ process. In an example, the downlink control information indicates a numerology of the uplink data channel. In an example, the wireless device may receive a second downlink control information indicating retransmission of the transport block.

Figure 20:
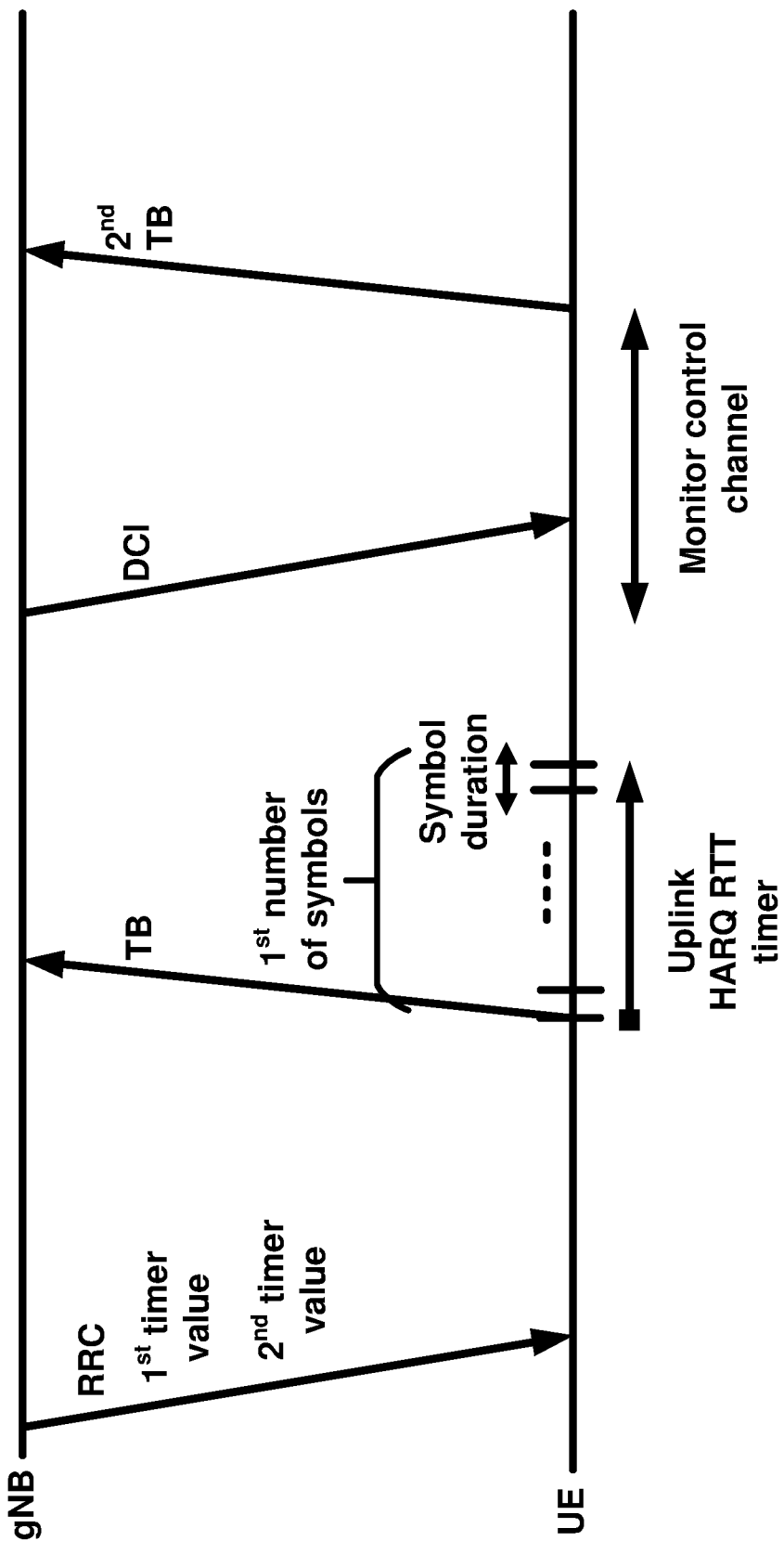
FIG. 20 is an example control channel monitoring as per an aspect of an embodiment of the present disclosure.

In an example embodiment and as shown in FIG. 20, a wireless device may receive one or more messages comprising a first value for an uplink hybrid automatic repeat request (HARQ) round-trip-time (RTT) timer. The first value indicates a first number of symbols. In an example, the symbols may correspond to second symbols of an uplink channel. In an example, the uplink channel may be PUCCH. This procedure enhances HARQ retransmission in a wireless device and base station by allowing a base station to configure different values for HARQ RTT timers for different wireless devices based on HARQ requirements. To provide additional flexibility, in example embodiments HARQ RTT timers are configured in terms of symbols instead of mili-seconds. This may increase downlink singling overhead, but instead improves control channel monitoring and HARQ retransmission. This procedure improves overall air interface spectral efficiency and power consumption.

The wireless device may transmit a transport block via an uplink data channel. The wireless device may the uplink HARQ RTT timer with the first value in response to transmitting the transport block, wherein the first value indicates a first number of symbols. In an example, the symbols correspond to first symbols of the uplink data channel. In an example, the slot lengths correspond to first slot lengths of the uplink data channel. The wireless device may, in response to the uplink HARQ RTT timer expiring, start monitoring a downlink control channel for downlink control information. The wireless device may transmit a second transport block in response to receiving the downlink control information. In an example, the wireless device may receive a downlink control information comprising transmission parameters of the transport block. In an example, the one or more messages may further comprise configuration parameters of a first cell and a second cell. The downlink control information may be received via the first cell. The transport block may be transmitted via the second cell. In an example, the one or more messages may further comprise configuration parameters of a first cell. The downlink control information may be received via the first cell. The transport block may be transmitted via the first cell. In an example, the downlink control information may indicate a HARQ process for the transport block. The uplink HARQ RTT timer may be associated with HARQ process. In an example, the downlink control information may indicate a numerology of the uplink data channel. In an example, the second transport block may be a retransmission of the transport block.

In an example embodiment, the wireless device may receive a first downlink control information (DCI) over a first downlink control channel (e.g., PDCCH/EPDCCH and/or alike). The DCI may indicate an uplink grant. The DCI may indicate parameters for a physical uplink shared channel (PUSCH) transmission of at least one transport block. In an example, the DCI may indicate transmission of the PUSCH in a same cell that the DCI is received (e.g., self-carrier scheduling). In an example, the DCI may be received and/or may indicate transmission of the PUSCH in a different cell than the cell that the DCI is received (e.g., cross-carrier scheduling). In an example, the DCI/uplink grant may indicate a first numerology/TTI for transmission of the at least one transport block. The at least one transport block may correspond to a first hybrid automatic repeat request (HARQ) process. In an example, the HARQ process identifier corresponding to the at least one transport block may be indicated in the DCI/uplink grant. In an example, the HARQ process identifier corresponding to the at least one transport block may be derived by the wireless device (e.g., based on the radio resources for transmission of the PUSCH). The wireless device may generate the at least one TB based on the parameters in the uplink grant. In an example, the wireless device may start an uplink HARQ round trip time (RTT) timer for the HARQ process (e.g., HARQ process corresponding to the at least one transport block). In an example, the wireless device may start the uplink HARQ RTT timer in response to transmitting at least one of the at least one TB.

In an example embodiment, a HAQR feedback timing corresponding to an uplink transmission may be indicated by the DCI/uplink grant. In an example, the DCI/uplink grant may indicate the subframe/slot/timing that the wireless device may expect to receive HARQ feedback in response to its uplink transmission (e.g., in PDCCH/EPDCCH and/or other downlink control channels) corresponding to the uplink transmission. In an example, the HARQ feedback timing may be indicated as a first integer in the DCI. To determine the HARQ feedback timing duration, the wireless device may multiply the first integer by a time granularity. In an example, the one or more messages (e.g., RRC configuration parameters) may comprise a plurality of values/numbers for the HARQ feedback timing determination and the HARQ feedback timing indicated by the DCI may provide an index to one of the plurality of HAQR ACK timing values indicated by the RRC.

In an example embodiment, a time duration from a start of the uplink HARQ RTT timer until expiration of the uplink HARQ RTT timer may be based on the first numerology/TTI (e.g., numerology/TTI indicated in the uplink grant and/or corresponding to the PUSCH). In an example, the time granularity for the uplink HARQ feedback timing may be OFDM symbol corresponding to the first numerology. In an example, the time granularity of the HARQ ACK timing may be slot duration corresponding to the first numerology. In an example, the time duration corresponding to the HARQ feedback timing may be TTI duration corresponding to the first numerology. In an example, the time duration from starting of the HARQ RTT timer until its expiration may be (a number indicated in the DCI (e.g., explicitly in DCI or DCI indicating a RRC configured value) and/or a number indicated in the DCI plus a first number, wherein in the first number may be configured/pre-configured and/or known by the wireless device) multiplied by the time granularity of the HARQ RTT timer.

In an example embodiment, a time duration from a start of the uplink HARQ RTT timer until expiration of the uplink HARQ RTT timer may be based on a numerology/TTI indicated in a DCI (e.g., DCI indicating the uplink grant). In an example, a time duration from a start of the uplink HARQ RTT timer until expiration of the uplink HARQ RTT timer may be based on a numerology/TTI configured by RRC (e.g., by configuring a mapping between PUSCH (e.g., numerology of PUSCH) and the numerology/TTI for time granularity of HARQ RTT timer). In an example, DCI may indicate an index to one of a plurality of numerologies/TTIs, the plurality of numerologies/TTIs being configured. E.g., by RRC. In an example, the time granularity for the uplink HARQ feedback timing may be OFDM symbol corresponding to the numerology indicated by the DCI/RRC. In an example, the time granularity of the HARQ ACK timing may be slot duration corresponding to the numerology indicated by the DCI/RRC. In an example, the time duration corresponding to the HARQ feedback timing may be TTI duration corresponding to the numerology indicated by the DCI/RRC. In an example, the time duration from starting of the HARQ RTT timer until its expiration may be (a number indicated in the DCI (e.g., explicitly in DCI or DCI indicating a RRC configured value) and/or a number indicated in the DCI plus a first number, wherein in the first number may be configured/pre-configured and/or known by the wireless device) multiplied by the time granularity of the HARQ RTT timer.

In an example embodiment, a wireless device may receive a first DCI indicating parameters for PUSCH transmission of at least one TB. In an example, the PUSCH may have a first numerology. In an example, the at least one TB may correspond to a first HARQ process. In an example, the wireless device may start a n uplink HARQ RTT timer for the HARQ process in response to transmitting the at least one TB on the PUSCH. In an example, the time granularity of the uplink HARQ RTT timer may be based on the first numerology. In an example, the time granularity of the uplink HARQ RTT timer may be based on a numerology indicated in the DCI (e.g., indicating an index to a plurality of RRC configured numerologies). In an example, the time granularity of the uplink HARQ RTT timer may be based on a pre-configured numerology. In an example, the time granularity of the uplink HARQ RTT timer may be based on an RRC configured numerology. The wireless device may receive a DCI in response to the HARQ RT timer expiring.

In an example embodiment, a wireless device may receive one or more messages comprising configuration parameters for one or more cells. In an example, the one or more cells may comprise a first cell. In an example, the one or more message may comprise RRC messages. In an example, the one or more messages may comprise a plurality of discontinuous reception (DRX) parameters for the wireless device. The plurality of DRX parameters may comprise a first value/number for a DRX retransmission timer. The wireless device may receive a first downlink control information (DCI) over a first downlink control channel (e.g., PDCCH/EPDCCH and/or alike). The DCI may indicate a downlink assignment. The DCI may indicate parameters for a physical downlink shared channel (PDSCH) transmission of at least one first transport block. In an example, the DCI may indicate transmission of the PDSCH in a same cell that the first DCI is received (e.g., self-carrier scheduling). In an example, the first DCI may be received and/or may indicate transmission of the PDSCH in a different cell than the cell that the first DCI is received (e.g., cross-carrier scheduling). In an example, the first DCI/downlink assignment may indicate a first numerology/TTI that the PDSCH/the at least one first transport block is transmitted. The at least one first transport block may correspond to a first hybrid automatic repeat request (HARQ) process. In an example, the first HARQ process identifier corresponding to the at least one first transport block may be indicated in the DCI/downlink assignment. In an example, the PDSCH may correspond to a PUCCH with a second numerology/TTI. In an example, the correspondence between the PDSCH and the PUCCH (e.g., correspondence between the first numerology and the second numerology) may be indicated in the one or more messages. In an example, the correspondence between the PDSCH and the PUCCH may be indicated in the DCI. In an example, the correspondence between the PDSCH and the PUCCH may be based on a pre-configured rule. In an example, the correspondence between the PDSCH and the PUCCH may be based on the first numerology/TTI associated with the PDSCH and/or service type of data transmitted by the PDSCH and/or the content of data/transport block(s) in the PDSCH (e.g., logical channels multiplexed in the transport block(s) carried by the PDSCH) and/or the size of transport block(s) carried by the PDSCH, and/or other parameters/rules. In an example, the wireless device may start a HARQ round trip time (RTT) timer for the HARQ process (e.g., HARQ process corresponding to the at least one transport block transmitted by the PDSCH). In an example, the wireless device may start the HARQ RTT timer in response to receiving the PDSCH. In an example, the wireless device may start the HARQ RTT timer in response to receiving the downlink assignment DCI. In an example, PDSCH may be received in a same subframe/slot/timing as the downlink assignment DCI. In an example, PDSCH may be received in a different subframe/slot/timing than the downlink assignment DCI.

In an example, the wireless device may start a discontinuous reception (DRX) Retransmission timer for the first HARQ process in response to the HARQ RTT timer expiring and the at least one first TB not being received successfully. In an example, the at least one first TB many not be received successfully in response to decoding the at least one TB in error.

In an example embodiment, a time duration from a start of the DRX retransmission timer until expiration of DRX retransmission timer may be based on the first numerology/TTI (e.g., numerology/TTI corresponding to the PDSCH). In an example, the time granularity for the DRX retransmission timer may be OFDM symbol corresponding to the first numerology. In an example, the time granularity of the DRX retransmission timer may be slot duration corresponding to the first numerology. In an example, the time duration corresponding to the DRX retransmission timer may be TTI duration corresponding to the first numerology. In an example, the time duration from starting of the DRX retransmission timer until its expiration may be the first value/number configured by RRC for the DRX retransmission timer multiplied by the time granularity for the DRX retransmission timer.

In an example embodiment, a time duration from a start of the DRX retransmission timer until expiration of DRX retransmission timer may be based on the second numerology/TTI (e.g., numerology/TTI corresponding to the PUCCH). In an example, the time granularity for the DRX retransmission timer may be OFDM symbol corresponding to the second numerology. In an example, the time granularity of the DRX retransmission timer may be slot duration corresponding to the second numerology. In an example, the time duration corresponding to the DRX retransmission timer may be TTI duration corresponding to the second numerology. In an example, the time duration from starting of the DRX retransmission timer until its expiration may be the first value/number configured by RRC for the DRX retransmission timer multiplied by the time granularity for the DRX retransmission timer.

In an example embodiment, a time duration from a start of the DRX retransmission timer until expiration of DRX retransmission timer may be based on a third numerology/TTI wherein the third numerology/TTI may be indicated/configured by RRC and/or pre-configured and/or indicated by the first DCI. In an example, the time granularity for the DRX retransmission timer may be OFDM symbol corresponding to the third numerology. In an example, the time granularity of the DRX retransmission timer may be slot duration corresponding to the third numerology. In an example, the time duration corresponding to the DRX retransmission timer may be TTI duration corresponding to the third numerology. In an example, the time duration from starting of the DRX retransmission timer until its expiration may be the first value/number configured by RRC for the DRX retransmission timer multiplied by the time granularity for the DRX retransmission timer.

In an example embodiment, RRC may configure a plurality of numerologies/TTIs for a wireless device. The first DCI indicating the downlink assignment may indicate a numerology/TTI among the plurality of numerologies/TTIs, e.g., using an index. In an example, the first DCI may comprise a field indicating an index, the index indicating a numerology/TTI for DRX retransmission timer time granularity determination.

In an example, the wireless device may receive a second DCI indicating a retransmission of the at least one first TB and/or transmission of at least one new TB.

In an example embodiment, wireless device may receive one or more messages comprising configuration parameters for a plurality of cells comprising a first cell. In an example, the wireless device may receive a first DCI indicating parameters for PDSCH transmission of a first TB on the first cell. In an example, the first TB may correspond to a first HARQ process. In an example, the PDSCH may correspond to a first numerology. In an example, the PDSCH may correspond to a PUCCH with a second numerology. In an example, the wireless device may start a HARQ RTT timer for the HARQ process in response to receiving the TB. In an example, the wireless device may starting a discontinuous reception (DRX) retransmission timer for the HARQ process in response to the HARQ RTT timer expiring and the first TB not being received successfully. In an example, the time granularity of the DRX retransmission timer may be based on the first numerology. In an example, the time granularity of the DRX retransmission timer may be based on the second numerology. In an example, the time granularity of the DRX retransmission timer may be based on a numerology indicated in the one or more messages. In an example, the time granularity of the DRX retransmission timer may be a pre-configured numerology. In an example, the time granularity of the DRX retransmission timer may be based on a numerology indicated in the first DCI. In an example, the wireless device may receive a second DCI indicating a retransmission of the first TB or a transmission of a second TB.

In an example embodiment, a wireless device may receive one or more messages comprising configuration parameters for one or more cells. In an example, the one or more cells may comprise a first cell. In an example, the one or more message may comprise RRC messages. In an example, the one or more messages may comprise a plurality of discontinuous reception (DRX) parameters for the wireless device. The plurality of DRX parameters may comprise a first value/number for a DRX uplink retransmission timer. The wireless device may receive a first downlink control information (DCI) over a first downlink control channel (e.g., PDCCH/EPDCCH and/or alike). The DCI may indicate an uplink grant. The DCI may indicate parameters for a physical uplink shared channel (PUSCH) transmission of at least one first transport block. In an example, the DCI may indicate transmission of the PUSCH in a same cell that the first DCI is received (e.g., self-carrier scheduling). In an example, the first DCI may be received and/or may indicate transmission of the PUSCH in a different cell that the cell than the first DCI is received (e.g., cross-carrier scheduling). In an example, the first DCI/uplink grant may indicate a first numerology/TTI that the PUSCH/the at least one first transport block is to be transmitted. The at least one first transport block may correspond to a first hybrid automatic repeat request (HARQ) process. In an example, the first HARQ process identifier corresponding to the at least one first transport block may be indicated in the DCI/uplink grant. In an example, the first HARQ process identifier may be derived by the wireless device, for example based on resources for transmission of the at least one first transport block. In an example, the wireless device may start an uplink HARQ RTT timer for the first HARQ process (e.g., HARQ process corresponding to the at least one transport block transmitted by the PUSCH). In an example, the wireless device may start the uplink HARQ RTT timer in response to transmitting the PUSCH/the at least one first transport block.

In an example embodiment, the wireless device may start a DRX uplink retransmission timer in response to an uplink HARQ RTT timer expiring.

In an example embodiment, a time duration from a start of the DRX uplink retransmission timer until expiration of the uplink DRX retransmission timer may be based on the first numerology/TTI (e.g., numerology/TTI corresponding to the PUSCH). In an example, the time granularity for the DRX uplink retransmission timer may be OFDM symbol corresponding to the first numerology. In an example, the time granularity of the DRX uplink retransmission timer may be slot duration corresponding to the first numerology. In an example, the time duration corresponding to the DRX uplink retransmission timer may be TTI duration corresponding to the first numerology. In an example, the time duration from starting of the DRX uplink retransmission timer until its expiration may be the first value/number configured by RRC for the DRX uplink retransmission timer multiplied by the time granularity for the DRX uplink retransmission timer.

In an example embodiment, a time duration from a start of the DRX uplink retransmission timer until expiration of the DRX uplink retransmission timer may be based on a second numerology/TTI wherein the second numerology/TTI may be indicated/configured by RRC and/or pre-configured and/or indicated by the first DCI. In an example, the time granularity for the DRX uplink retransmission timer may be OFDM symbol corresponding to the second numerology. In an example, the time granularity of the DRX uplink retransmission timer may be slot duration corresponding to the second numerology. In an example, the time duration corresponding to the DRX uplink retransmission timer may be TTI duration corresponding to the second numerology. In an example, the time duration from starting of the DRX uplink retransmission timer until its expiration may be the first value/number configured by RRC for the DRX uplink retransmission timer multiplied by the time granularity for the DRX uplink retransmission timer.

In an example embodiment, RRC may configure a plurality of numerologies/TTIs for a wireless device. The first DCI indicating the uplink grant may indicate a numerology/TTI among the plurality of numerologies/TTIs, e.g., using an index. In an example, the first DCI may comprise a field indicating an index, the index indicating a numerology/TTI for DRX uplink retransmission timer time granularity determination.

In an example, the wireless device may receive a second DCI indicating a retransmission of the at least one first TB and/or transmission of at least one new TB.

In an example embodiment, a wireless device may employ a method comprising receiving one or more messages comprising configuration parameters for a plurality of cells comprising a first cell. The wireless device may receive a first DCI indicating parameters for PUSCH transmission of a first TB on the first cell. In an example, the first TB may correspond to a first HARQ process. In an example, the PUSCH may correspond to a first numerology. The wireless device may start an uplink HARQ RTT timer for the HARQ process in response to transmitting the TB. In an example, the wireless device may start a DRX uplink retransmission timer for the HARQ process in response to the uplink HARQ RTT timer expiring. In an example, the time granularity of the DRX retransmission timer may be based on the first numerology. In an example, the time granularity of the DRX retransmission timer may be based on a numerology indicated in the one or more messages. In an example, the time granularity of the DRX retransmission timer may be a pre-configured numerology. In an example, the time granularity of the DRX retransmission timer may be based on a numerology indicated in the first DCI. The wireless device may receive a second DCI indicating a retransmission of the first TB or a transmission of a second TB.

In an example embodiment, a wireless device may receive one or more messages comprising configuration parameters for one or more cells. In an example, the one or more cells may comprise a first cell. In an example, the one or more message may comprise RRC messages. In an example, the one or more messages may comprise a plurality of discontinuous reception (DRX) parameters for the wireless device. The plurality of DRX parameters may comprise a first value/number for a DRX inactivity timer. The wireless device may receive a first downlink control information (DCI) over a first downlink control channel (e.g., PDCCH/EPDCCH and/or alike). The first DCI may indicate parameters for a scheduled transmission. In an example, the scheduled transmission may comprise downlink assignment and/or an uplink grant and/or grant for sidelink communications. In an example, the first DCI may indicate parameters for a PUSCH and/or PDSCH and/or physical sidelink shared channel (PSSCH) transmission of at least one first transport block. In an example, the first DCI may schedule transmission in a same cell that the first DCI is received (e.g., self-carrier scheduling). In an example, the first DCI may schedule transmission in a different cell than the cell that the first DCI is received (e.g., cross-carrier scheduling). In an example, the first DCI/uplink grant may indicate a first numerology/TTI that the at least one first transport block is transmitted and/or to be transmitted (e.g., on PDSCH and/or PUSCH and/or PSSCH, etc.). The at least one first transport block may correspond to a first hybrid automatic repeat request (HARQ) process. In an example, the first HARQ process identifier corresponding to the at least one first transport block may be indicated in the DCI. In an example, the first HARQ process identifier may be derived by the wireless device, for example based on resources for transmission of the at least one first transport block. In an example, the wireless device may start a DRX inactivity timer in response to receiving the first DCI indicating the scheduled transmission.

In an example embodiment, a time duration from a start of the DRX inactivity timer until expiration of the DRX inactivity timer may be based on the first numerology/TTI (e.g., numerology/TTI corresponding to a PDSCH, PUSCH, PSSCH, etc.). In an example, the time granularity for the DRX inactivity timer may be OFDM symbol corresponding to the first numerology. In an example, the time granularity of the DRX inactivity timer may be slot duration corresponding to the first numerology. In an example, the time duration corresponding to the DRX inactivity timer may be TTI duration corresponding to the first numerology. In an example, the time duration from starting of the DRX inactivity timer until its expiration may be the first value/number configured by RRC for the DRX inactivity timer multiplied by the time granularity for the DRX retransmission timer.

In an example embodiment, a time duration from a start of the DRX inactivity timer until expiration of the DRX inactivity timer may be based on a second numerology/TTI wherein the second numerology/TTI may be indicated/configured by RRC and/or pre-configured and/or indicated by the first DCI. In an example, the time granularity for the DRX inactivity timer may be OFDM symbol corresponding to the second numerology. In an example, the time granularity of the DRX inactivity timer may be slot duration corresponding to the second numerology. In an example, the time duration corresponding to the DRX inactivity timer may be TTI duration corresponding to the second numerology. In an example, the time duration from starting of the DRX inactivity timer until its expiration may be the first value/number configured by RRC for the DRX inactivity timer multiplied by the time granularity for the DRX inactivity timer.

In an example embodiment, RRC may configure a plurality of numerologies/TTIs for a wireless device. The first DCI indicating the scheduled transmission may indicate a numerology/TTI among the plurality of numerologies/TTIs, e.g., using an index. In an example, the first DCI may comprise a field indicating an index, the index indicating a numerology/TTI for DRX inactivity timer time granularity determination.

In an example, the wireless device may transition/start a DRX off cycle in response to the DRX inactivity timer expiring. In an example, the wireless device may limit monitoring the radio network temporary identifiers (RNTIs) in the DRX off cycle to save power.

In an example embodiment, a wireless device may employ a method comprising receiving one or more messages comprising configuration parameters for a plurality of cells comprising a first cell. The wireless device may receive a DCI indicating parameters for a scheduled transmission in downlink or uplink or sidelink wherein the scheduled transmission may correspond to a first numerology. In an example, the wireless device may start a DRX inactivity timer, wherein the time granularity of the DRX inactivity timer may be based on the first numerology. In an example, the wireless device may start a DRX inactivity timer, wherein the time granularity of the DRX inactivity timer may be based on a numerology indicated in the one or more messages. In an example, the wireless device may start a DRX inactivity timer, wherein the time granularity of the DRX inactivity timer may be based on a numerology indicated in the DCI. In an example, the wireless device may start a DRX inactivity timer, wherein the time granularity of the DRX inactivity timer may be based on a pre-configured numerology. In an example, the wireless device may transition into a new DRX cycle (e.g., DRX off) in response to the DRX inactivity timer expiring.

According to various embodiments, a device such as, for example, a wireless device, a base station, base station central unit, a base station distributed unit, a core network entity, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 21 is an example flow diagram as per an aspect of an embodiment of the present disclosure. At 2110, a wireless device may receive one or more messages. The one or more messages may comprise a first value for a downlink hybrid automatic repeat request (HARQ) round-trip-time (RTT) timer. The one or more messages may comprise a second value for a downlink discontinuous reception (DRX) retransmission timer. At 2120, the wireless device may receive a downlink control information indicating downlink transmission of a transport block. At 2130, the downlink HARQ RTT timer may be started with the first value in response to receiving the downlink control information. The first value may indicate a first number of symbols. At 2140, the downlink DRX retransmission timer may be started with the second value in response to the downlink HARQ RTT timer expiring and the transport block not being successfully decoded. The second value may indicate a second number of slot lengths. At 2150, a downlink control channel may be monitored while the downlink DRX retransmission timer is running.

According to an embodiment, the symbols may correspond to first symbols of a downlink channel. According to an embodiment, the symbols may correspond to second symbols of an uplink channel. According to an embodiment, the slot lengths may correspond to second slot lengths of an uplink channel. According to an embodiment, the slot lengths may correspond to first slot lengths of a downlink channel. According to an embodiment, the transport block may be received via the downlink channel. According to an embodiment, a HARQ feedback corresponding to the transport block may be transmitted via the uplink channel. According to an embodiment, the one or more messages may comprise a third value in a third plurality of values indicating a time duration between a first transmission time of the transport block and a second transmission time of HARQ feedback corresponding to the transport block. According to an embodiment, the downlink control information may indicate an index to the third value in the third plurality of values. According to an embodiment, the transport block may be received via the downlink channel in a first slot. According to an embodiment, the HARQ feedback may be transmitted in a second slot. According to an embodiment, a time duration between the first slot and the second slot may be based on the third value. According to an embodiment, the third value may be an integer. According to an embodiment, the one or more messages may comprise configuration parameters of a first cell and a second cell. According to an embodiment, the downlink control information may be received via the first cell. According to an embodiment, the transport block may be received via the second cell. According to an embodiment, the one or more messages may comprise configuration parameters of a first cell. According to an embodiment, the downlink control information may be received via the first cell. According to an embodiment, the transport block may be received via the first cell. According to an embodiment, the downlink control information may indicate a HARQ process for the transport block. According to an embodiment, the downlink HARQ RTT timer and the downlink DRX retransmission timer may be associated with the HARQ process. According to an embodiment, the downlink control information and the transport block may be received in different slots. According to an embodiment, the downlink control information and transport block maybe received in a same slot. According to an embodiment a second downlink control information indicating retransmission of the transport block may be received.

Figure 22:
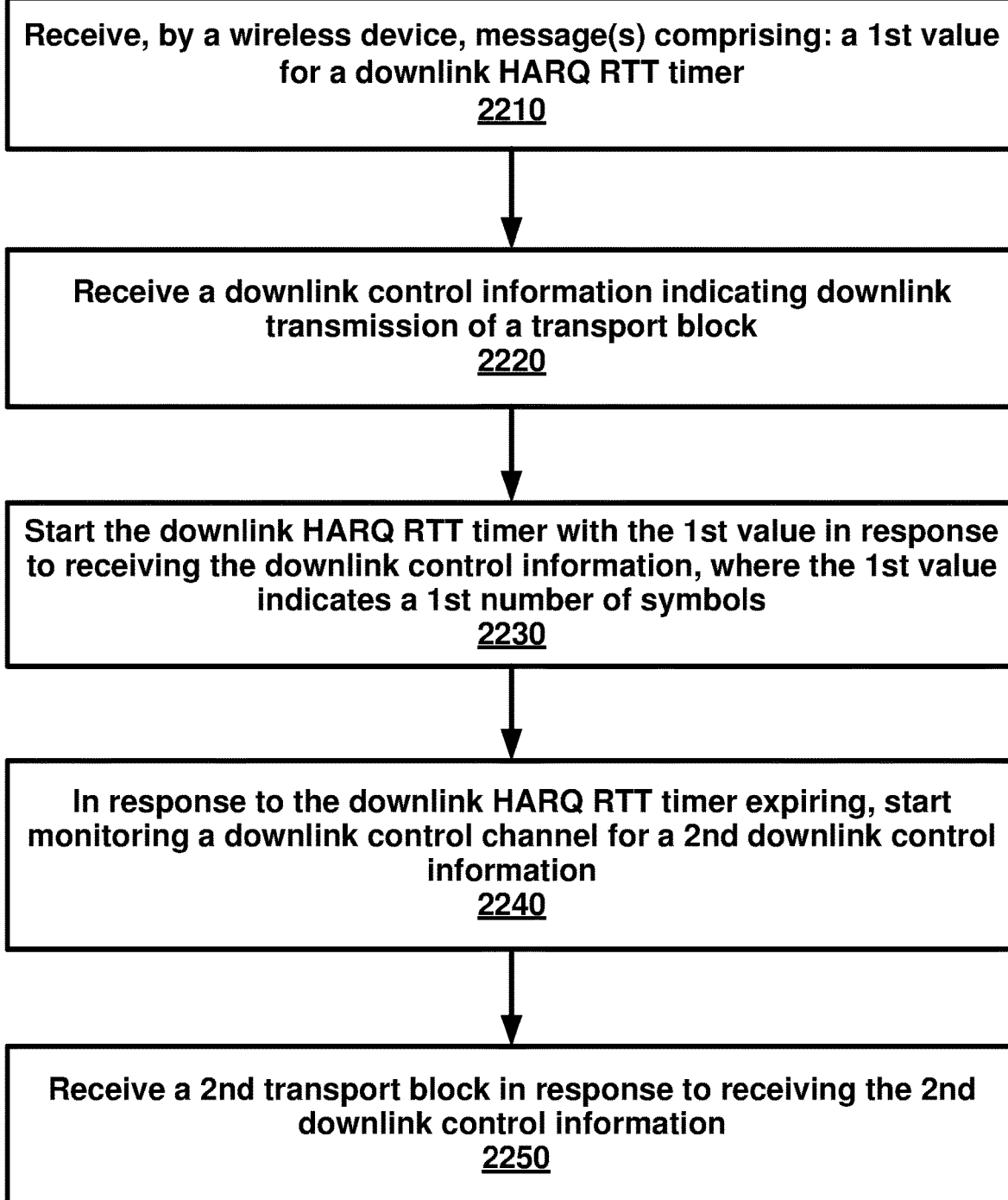
FIG. 22 is a flow diagram of an aspect of an embodiment of the present disclosure.

FIG. 22 is an example flow diagram as per an aspect of an embodiment of the present disclosure. At 2210, a wireless device may receive one or more messages. The one or more messages may comprise a first value for a downlink hybrid automatic repeat request (HARQ) round-trip-time (RTT) timer. At 2220, a downlink control information may be received. The downlink control information may indicate downlink transmission of a transport block. At 2230, the downlink HARQ RTT timer may be started with the first value in response to receiving the downlink control information. The first value may indicate a first number of symbols. At 2240, in response to the downlink HARQ RTT timer expiring, monitoring a downlink control channel for a $2^{nd}$ downlink control information may start. At 2250, a second transport block may be received in response to receiving the $2^{nd}$ downlink control information.

According to an embodiment, the symbols may correspond to first symbols of a downlink channel. According to an embodiment, the symbols may correspond to second symbols of an uplink channel. According to an embodiment, the transport block may be received via the downlink channel. According to an embodiment, a HARQ feedback corresponding to the transport block may be transmitted via the uplink channel. According to an embodiment, the one or more messages may comprise a third value in a third plurality of values indicating a time duration between a first transmission time of the transport block and a second transmission time of HARQ feedback corresponding to the transport block. According to an embodiment, the downlink control information may indicate an index to the third value in the third plurality of values. According to an embodiment, the transport block may be received via the downlink channel in a first slot. According to an embodiment, the HARQ feedback may be transmitted in a second slot. According to an embodiment, a time duration between the first slot and the second slot may be based on the third value. According to an embodiment, the third value may be an integer. According to an embodiment, the one or more messages may comprise configuration parameters of a first cell and a second cell. According to an embodiment, the downlink control information may be received via the first cell. According to an embodiment, the transport block may be received via the second cell. According to an embodiment, the one or more messages may comprise configuration parameters of a first cell. According to an embodiment, the downlink control information may be received via the first cell. According to an embodiment, the transport block may be received via the first cell. According to an embodiment, the downlink control information may indicate a HARQ process for the transport block. According to an embodiment, the downlink HARQ RTT timer may be associated with the HARQ process. According to an embodiment, the downlink control information and the transport block may be received in different slots. According to an embodiment, the downlink control information and transport block may be received in a same slot. According to an embodiment, the second transport block may be a retransmission of the transport block.

Figure 23:
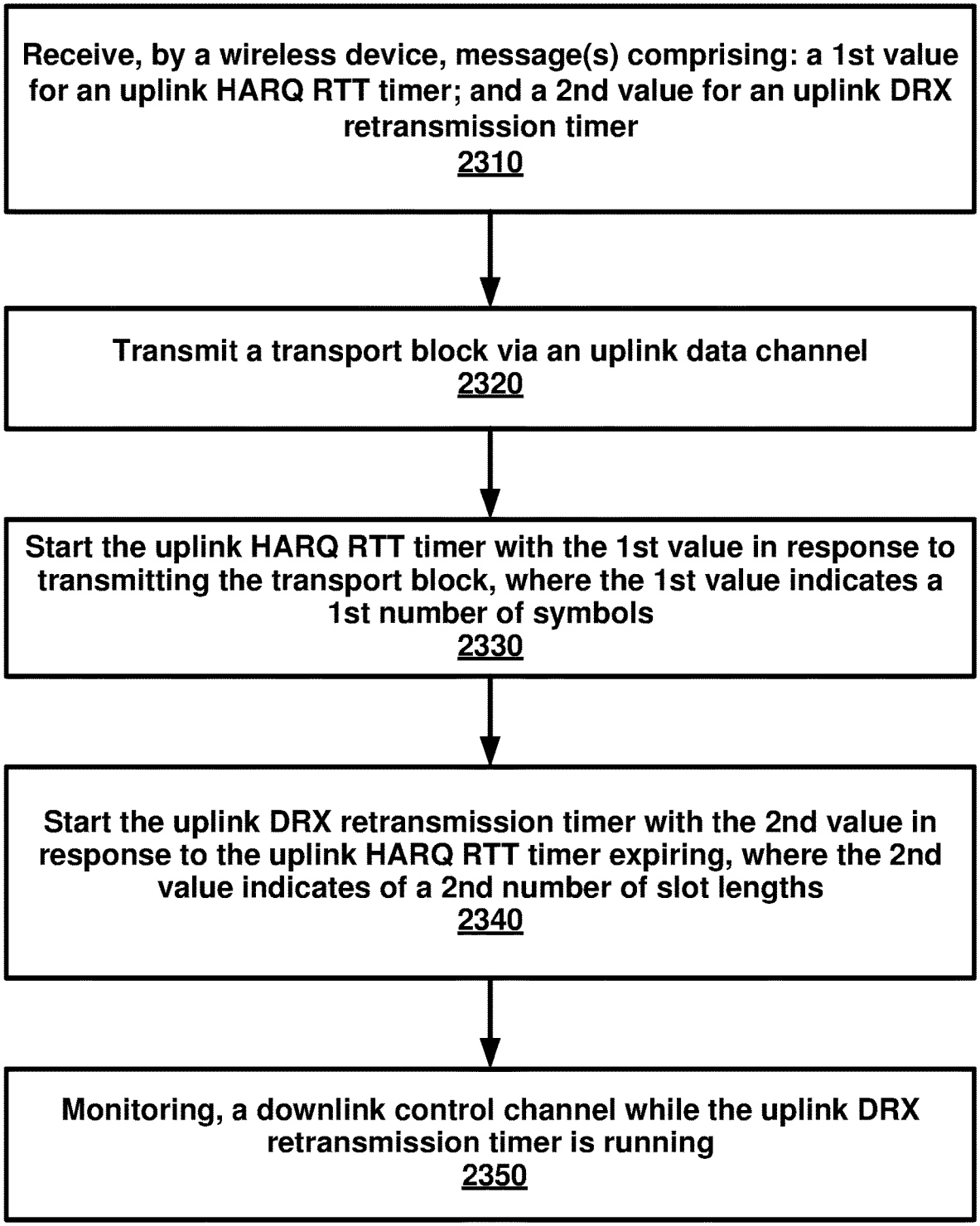
FIG. 23 is a flow diagram of an aspect of an embodiment of the present disclosure.

FIG. 23 is an example flow diagram as per an aspect of an embodiment of the present disclosure. At 2310, a wireless device may receive one or more messages. The one or more messages may comprise a first value for an uplink hybrid automatic repeat request (HARQ) round-trip-time (RTT) timer. The one or more messages may comprise a second value for an uplink discontinuous reception (DRX) retransmission timer. At 2320, a transport block may be transmitted via an uplink data channel. At 2330, the uplink HARQ RTT timer may be started with the first value in response to transmitting the transport block. The first value may indicate a first number of symbols. At 2340, the uplink DRX retransmission timer may be started with the second value in response to the uplink HARQ RTT timer expiring. The second value may indicate a second number of slot lengths. At 2350, a downlink control channel may be monitored while the uplink DRX retransmission timer is running.

According to an embodiment, the symbols may correspond to first symbols of the uplink data channel. According to an embodiment, the slot lengths may correspond to first slot lengths of the uplink data channel. a downlink control information comprising transmission parameters of the transport block may be received. According to an embodiment, the one or more messages may comprise configuration parameters of a first cell and a second cell. According to an embodiment, the downlink control information may be received via the first cell. According to an embodiment, the transport block may be transmitted via the second cell. According to an embodiment, the one or more messages may comprise configuration parameters of a first cell. According to an embodiment, the downlink control information may be received via the first cell. According to an embodiment, the transport block may be transmitted via the first cell. According to an embodiment, the downlink control information may indicate a HARQ process for the transport block. According to an embodiment, the uplink HARQ RTT timer and the uplink DRX retransmission timer may be associated with the HARQ process. According to an embodiment, the downlink control information may indicate a numerology of the uplink data channel. According to an embodiment, a second downlink control information indicating retransmission of the transport block may be received.

Figure 24:
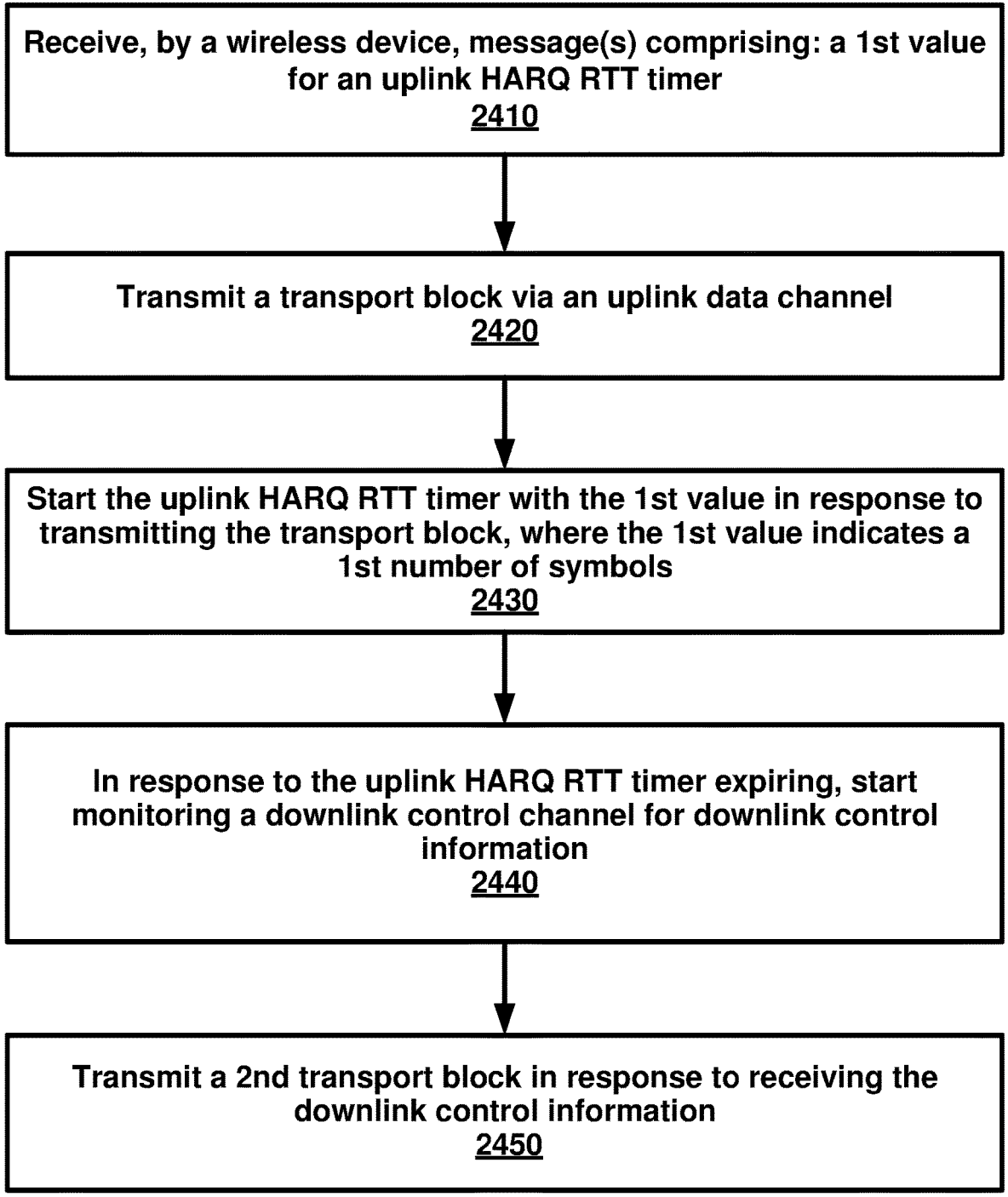
FIG. 24 is a flow diagram of an aspect of an embodiment of the present disclosure.

FIG. 24 is an example flow diagram as per an aspect of an embodiment of the present disclosure. At 2410, a wireless device may receive one or more messages. The one or more messages may comprise a first value for an uplink hybrid automatic repeat request (HARQ) round-trip-time (RTT) timer. At 2420, a transport block may be transmitted via an uplink data channel. At 2430, the uplink HARQ RTT timer may be started with the first value in response to transmitting the transport block. The first value may indicate a first number of symbols. At 2440, in response to the uplink HARQ RTT timer expiring, monitoring of a downlink control channel for downlink control information may be started. At 2450, a second transport block may be transmitted in response to receiving the downlink control information.

According to an embodiment, the symbols may correspond to first symbols of the uplink data channel. According to an embodiment, the slot lengths may correspond to first slot lengths of the uplink data channel. According to an embodiment, a downlink control information comprising transmission parameters of the transport block may be received. According to an embodiment, the one or more messages may comprise configuration parameters of a first cell and a second cell. According to an embodiment, the downlink control information may be received via the first cell. According to an embodiment, the transport block may be transmitted via the second cell. According to an embodiment, the one or more messages may comprise configuration parameters of a first cell. According to an embodiment, the downlink control information may be received via the first cell. According to an embodiment, the transport block may be transmitted via the first cell. According to an embodiment, the downlink control information may indicate a HARQ process for the transport block. According to an embodiment, the uplink HARQ RTT timer and the uplink DRX retransmission timer may be associated with the HARQ process. According to an embodiment, the downlink control information may indicate a numerology of the uplink data channel. According to an embodiment, the second transport block may be a retransmission of the transport block.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A wireless device comprising: one or more processors; and memory storing instructions that, when executed by the one or more processors, cause the wireless device to:
   receive one or more radio resource control messages comprising a downlink hybrid automatic repeat request (HARQ) round-trip-time (RTT) timer value expressed in units of symbols and a downlink discontinuous reception (DRX) retransmission timer value expressed in units of slot lengths;
   receive a downlink control information indicating downlink transmission of a transport block;
   start a downlink HARQ RTT timer with the downlink HARQ RTT timer value in response to receiving the downlink control information, wherein the downlink HARQ RTT timer value indicates a first number of symbols;
   start a downlink DRX retransmission timer with the downlink DRX retransmission timer value in response to the downlink HARQ RTT timer expiring and the transport block not being successfully decoded, wherein the downlink DRX retransmission timer value indicates a second number of slot lengths; and
   monitor a downlink control channel while the downlink DRX retransmission timer is running.

2. The wireless device of claim 1, wherein the symbols correspond to first symbols of a downlink channel.

3. The wireless device of claim 1, wherein the symbols correspond to second symbols of an uplink channel.

4. The wireless device of claim 1, wherein the slot lengths correspond to first slot lengths of a downlink channel.

5. The wireless device of claim 1, wherein the slot lengths correspond to second slot lengths of an uplink channel.

6. The wireless device of claim 1, wherein:
   the one or more radio resource control messages further comprise configuration parameters of a first cell and a second cell;
   the downlink control information is received via the first cell; and the transport block is received via the second cell.

7. The wireless device of claim 1, wherein:
   the downlink control information indicates a HARQ process for the transport block; and
   the downlink HARQ RTT timer and the downlink DRX retransmission timer are associated with the HARQ process.

8. The wireless device of claim 1, wherein the downlink control information and the transport block are received in different slots.

9. The wireless device of claim 1, wherein the downlink control information and transport block are received in a same slot.

10. The wireless device of claim 1, wherein the one or more radio resource control messages further comprise a plurality of values indicating a time duration between a first transmission time of the transport block and a second transmission time of HARQ feedback corresponding to the transport block.

11. The wireless device of claim 1, wherein the instructions, when executed by the one or more processors, cause the wireless device to receive a second downlink control information indicating retransmission of the transport block.

12. The wireless device of claim 2, wherein the transport block is received via the downlink channel.

13. The wireless device of claim 2, wherein the downlink control information and the transport block are received in different slots.

14. The wireless device of claim 3, wherein a HARQ feedback corresponding to the transport block is transmitted via the uplink channel.

15. The wireless device of claim 4, wherein the transport block is received via the downlink channel.

16. The wireless device of claim 5, wherein a HARQ feedback corresponding to the transport block is transmitted via the uplink channel.

17. The wireless device of claim 7, wherein the downlink control information and the transport block are received in different slots.

18. The wireless device of claim 7, wherein the downlink control information and transport block are received in a same slot.

19. The wireless device of claim 10, wherein:
   the downlink control information indicates an index to a third value in the plurality of values indicating the time duration;
   the transport block is received via a downlink channel in a first slot;
   the HARQ feedback is transmitted in a second slot; and
   a time duration between the first slot and the second slot is based on the third value.

20. The wireless device of claim 19, wherein the third value is an integer.

* * * * *